(12) United States Patent
Chapman

(10) Patent No.: US 10,146,108 B2
(45) Date of Patent: Dec. 4, 2018

(54) BALANCED CAMERA SLIDER

(71) Applicant: CHAPMAN/LEONARD STUDIO EQUIPMENT, INC., North Hollywood, CA (US)

(72) Inventor: Leonard T. Chapman, North Hollywood, CA (US)

(73) Assignee: Chapman/Leonard Studio Equipment, Inc., North Hollywood, CA (US)

( * ) Notice: Subject to any disclaimer, the term of this patent is extended or adjusted under 35 U.S.C. 154(b) by 0 days.

(21) Appl. No.: 15/434,786

(22) Filed: Feb. 16, 2017

(65) Prior Publication Data

US 2017/0205688 A1    Jul. 20, 2017

Related U.S. Application Data

(63) Continuation-in-part of application No. 15/282,607, filed on Sep. 30, 2016, which is a continuation-in-part
(Continued)

(51) Int. Cl.
| | |
|---|---|
| *F16M 13/00* | (2006.01) |
| *G03B 17/56* | (2006.01) |
| *F16M 11/18* | (2006.01) |
| *F16M 11/42* | (2006.01) |
| *F16M 11/04* | (2006.01) |
| *F16M 11/12* | (2006.01) |

(Continued)

(52) U.S. Cl.
CPC ......... *G03B 17/561* (2013.01); *F16M 11/046* (2013.01); *F16M 11/121* (2013.01); *F16M 11/18* (2013.01); *F16M 11/2064* (2013.01); *F16M 11/2092* (2013.01); *F16M 11/42* (2013.01); *G03B 19/18* (2013.01)

(58) Field of Classification Search
CPC .. G03B 17/00; A47F 5/00; A47F 7/00; F16M 11/00; F16M 13/00; F16M 11/04; A47H 1/10
USPC .................. 396/428; 248/123.2, 298.1, 187.1
See application file for complete search history.

(56) References Cited

U.S. PATENT DOCUMENTS

| | | | |
|---|---|---|---|
| 4,952,953 A | * | 8/1990 | Ridderstolpe ......... B66F 11/048 248/364 |
| 5,856,862 A | | 1/1999 | Kokush |

(Continued)

FOREIGN PATENT DOCUMENTS

| KR | 20010104148 A | 11/2001 |
|---|---|---|
| NL | 9000830 A | 11/1991 |

OTHER PUBLICATIONS

United States Patent and Trademark Office, Office Action for U.S. Appl. No. 15/282,607, dated Mar. 27, 2018; 20 pages.
(Continued)

*Primary Examiner* — Clayton E Laballe
*Assistant Examiner* — Fang-Chi Chang
(74) *Attorney, Agent, or Firm* — Perkins Coie LLP; Kenneth H. Ohriner

(57) ABSTRACT

A camera slider has a base and a tubular hollow arm pivotally attached to the base. A counterweight carriage is supported on the arm on carriage rollers. An electric drive motor moves the counterweight carriage linearly on top of the arm. A slider counterweight is movable between ends of the arm to maintain the arm in balance. A telescoping locking strut allows the arm to be held at a wide range of elevation angles.

3 Claims, 27 Drawing Sheets

Related U.S. Application Data of application No. 14/683,931, filed on Apr. 10, 2015, now Pat. No. 9,507,244.

(51) Int. Cl.
*F16M 11/20* (2006.01)
*G03B 19/18* (2006.01)

(56) References Cited

U.S. PATENT DOCUMENTS

| | | |
|---|---|---|
| 8,333,520 B1 | 12/2012 | Cronin et al. |
| 8,733,478 B2 | 5/2014 | Chapman |
| 9,507,244 B2 | 11/2016 | Chapman |
| 9,586,561 B1 * | 3/2017 | Nganga ................. B60S 3/047 |
| 2005/0191050 A1 | 9/2005 | Chapman |
| 2011/0309213 A1 | 12/2011 | Valles Navarro et al. |
| 2013/0259463 A1 | 10/2013 | Dybowski |

OTHER PUBLICATIONS

European Patent Office, Extended European Search Report for European Application No. 17194395.4, dated Mar. 5, 2018; 7 pages.
Canadian Patent Office Examination Report for Canadian Patent Application No. 2,979,142, dated Aug. 7, 2018; 4 pages.

\* cited by examiner

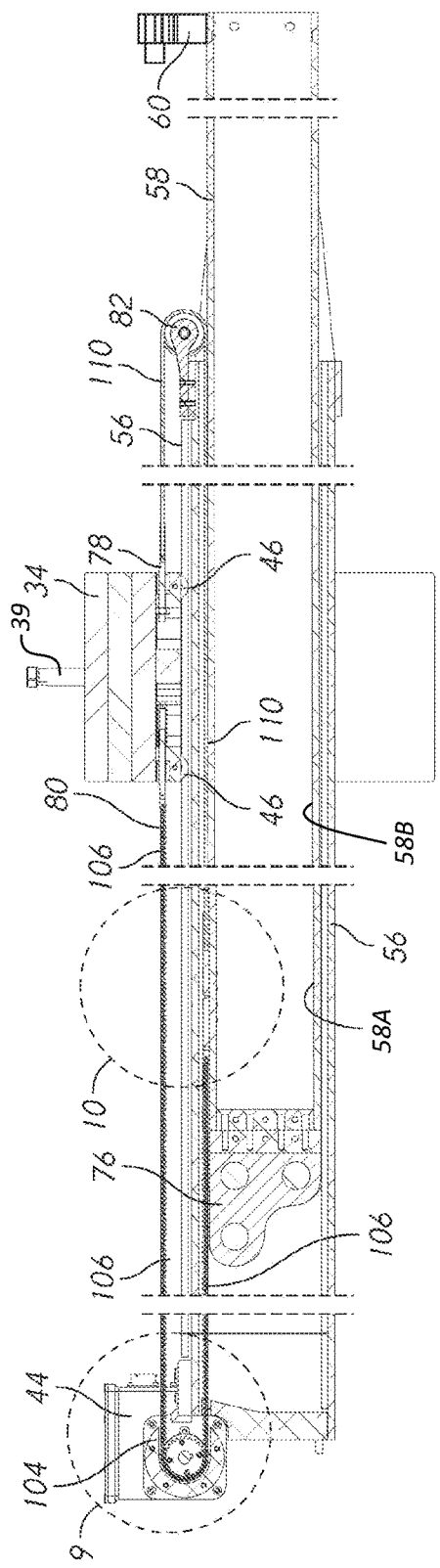
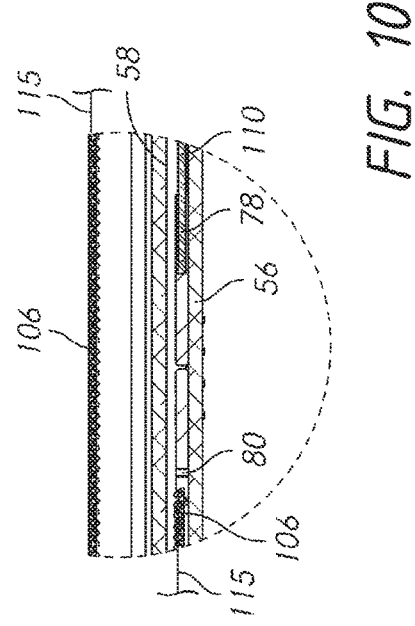
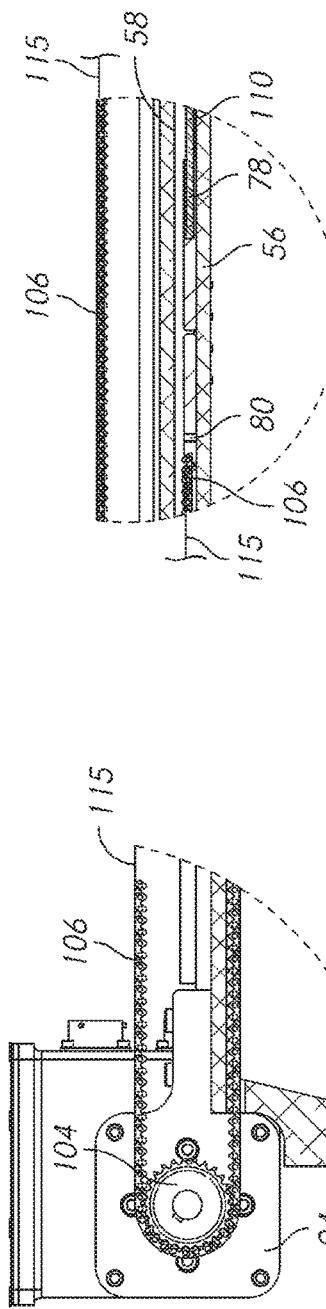
FIG. 8
FIG. 9
FIG. 10

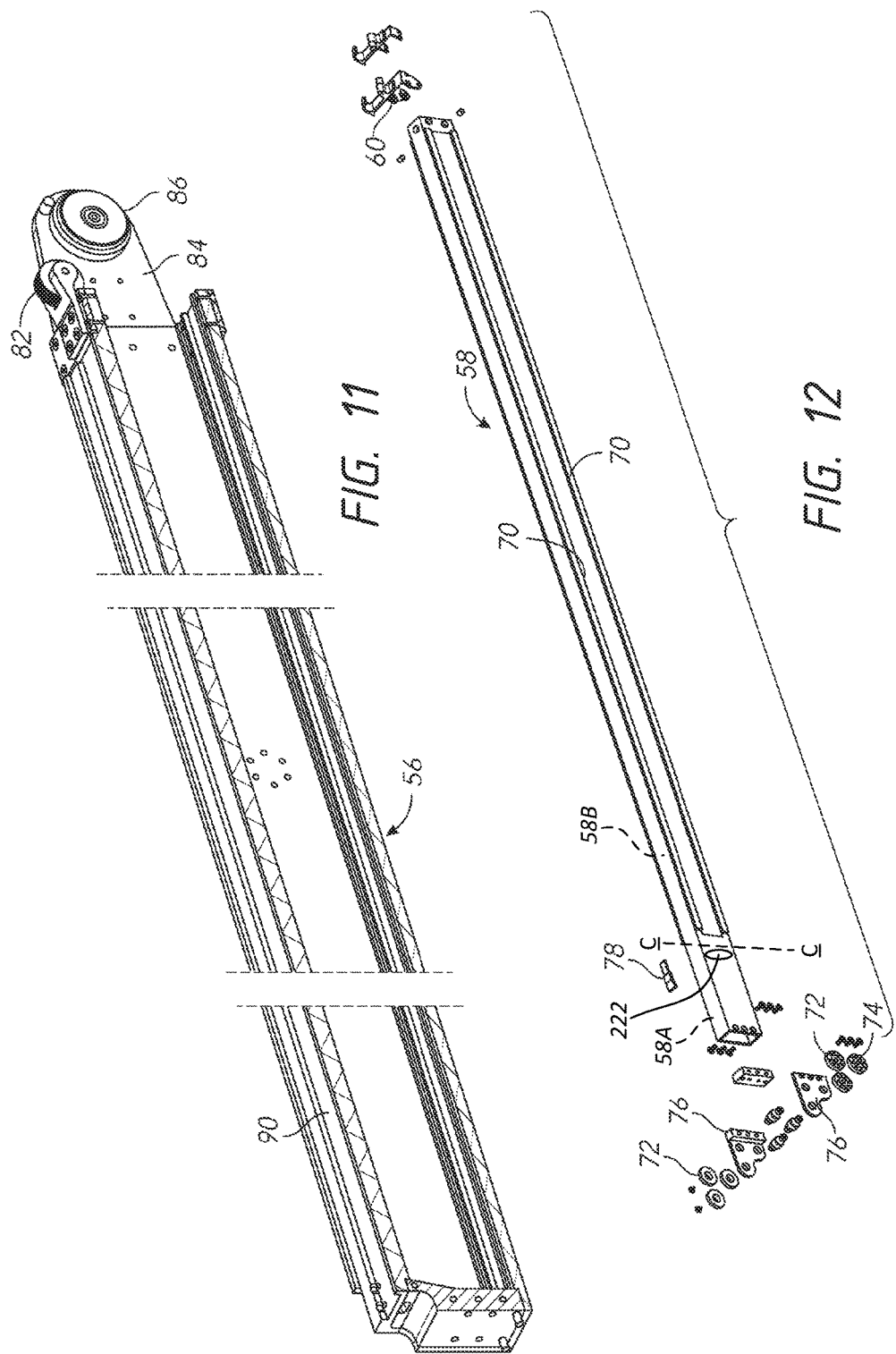

BALANCED CAMERA SLIDER

CROSS-REFERENCE TO RELATED APPLICATION

This Application is a Continuation-in-Part of U.S. patent application Ser. No. 15/282,607 filed Sep. 30, 2016 and now pending, which is a Continuation-in-Part of U.S. patent application Ser. No. 14/683,931 filed Apr. 10, 2015 and now pending. These applications are incorporated herein by reference.

BACKGROUND OF THE INVENTION

The field of the invention is camera cranes and camera sliders. Camera cranes are often used in motion picture and television production. The motion picture or television camera is typically mounted on the front end of a crane arm with counterweights at the back end of the crane arm. The crane arm is pivotally supported on a base to allow the crane arm to tilt up and down about a tilt axis and from side-to-side about a pan axis. The base is typically supported on a camera dolly, wheeled mobile base, or truck.

Telescoping camera cranes have a telescoping arm that can extend and retract, providing far more capability than fixed length crane arms. However, existing telescoping camera cranes generally weigh several hundred kilograms, which exceeds the safe load carrying capacity of small portable camera dollies. Consequently, for filming in confined or less accessible spaces where only a small portable camera dolly can be used, there are few if any options for using a telescoping camera crane.

Of course, existing telescoping camera cranes can be made smaller which also makes them lighter. However, regardless of the size, the camera crane must be able to consistently hold the camera (and various associated payloads such as a remote camera head) in a steady position, even with the arm fully extended. As the camera crane size is reduced, the smaller structural components of the camera crane have reduced capability to resist unintended or undesirable camera movements, due to bending, flexing, twisting, or vibration. Accordingly, engineering challenges remain in designing a lightweight and compact telescoping camera crane.

Camera sliders have a camera mounting platform slidably attached onto a track or rail, for moving the camera linearly. Camera sliders are useful for recording or filming various types of sequences. For example, a camera slider may be for a single axis sequence, where the camera is simply moved linearly with the lens perpendicular to the track, or in a so-called push-in sequence, with the lens parallel to the track, for pushing into the scene. Using a camera head on the slide allows for panning or tilting during sliding movement. The track may optionally be inclined, adding further versatility.

However, most sliders have a limited payload capacity primarily because they lack any form of counterbalancing system. They can also be time consuming to set up and use. Consequently engineering challenges remain in the design of camera sliders.

SUMMARY OF THE INVENTION

In one aspect a camera slider has a base and a tubular hollow outer arm pivotally attached to the base. A counterweight carriage is supported on the outer arm on carriage rollers. An electric drive motor moves the counterweight carriage linearly on top of the outer arm. A slider counterweight is movable from a first position, wherein the counterweight carriage is at or near a first end of a first end of outer arm and the slider counterweight is at or near a second end of the outer arm, optionally projecting out of the arm, and a second position wherein the counterweight carriage is at or near the second end of the arm and the slider counterweight is at or near the first end of the arm.

Other aspects and features are shown in the drawings, which show one example of how the lightweight camera crane and a camera slider may be designed, and which are not intended to specify a limit on the scope of the invention.

BRIEF DESCRIPTION OF THE DRAWINGS

FIG. 8 is a side view in part section of the crane as shown in FIG. 7.

FIG. 9 is an enlarged detail section view of the back end of the crane as shown in FIG. 8.

FIG. 10 is an enlarged detail section view of a portion of the counterweight carriage as shown in FIG. 8, with covers removed in FIGS. 7-10 for purpose of illustration.

FIG. 11 is a top, right and rear perspective view, in part section, of the outer arm shown in FIGS. 1 and 2.

FIG. 12 is an exploded top, rear and right side perspective view of the inner arm shown in FIGS. 1 and 2.

DETAILED DESCRIPTION OF THE DRAWINGS

Figure 1:
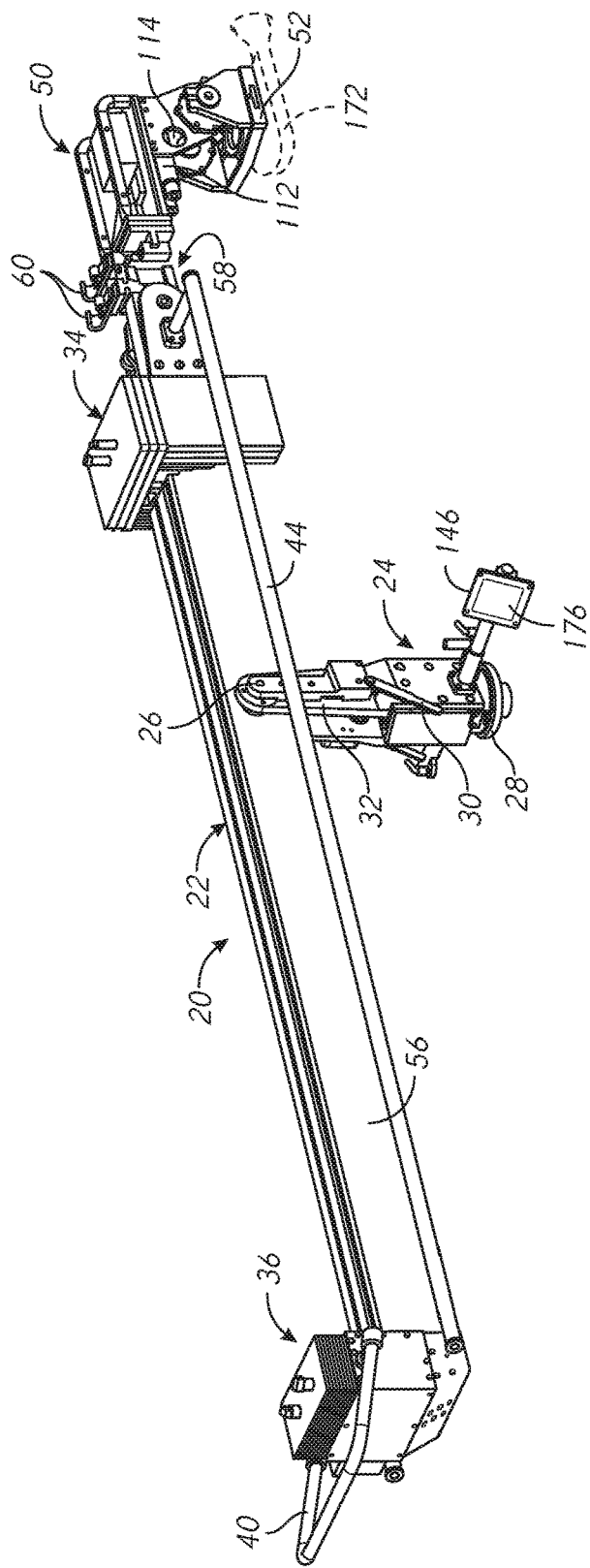
FIG. 1 is a top, rear and right side perspective view of a lightweight telescoping camera crane.
Figure 2:
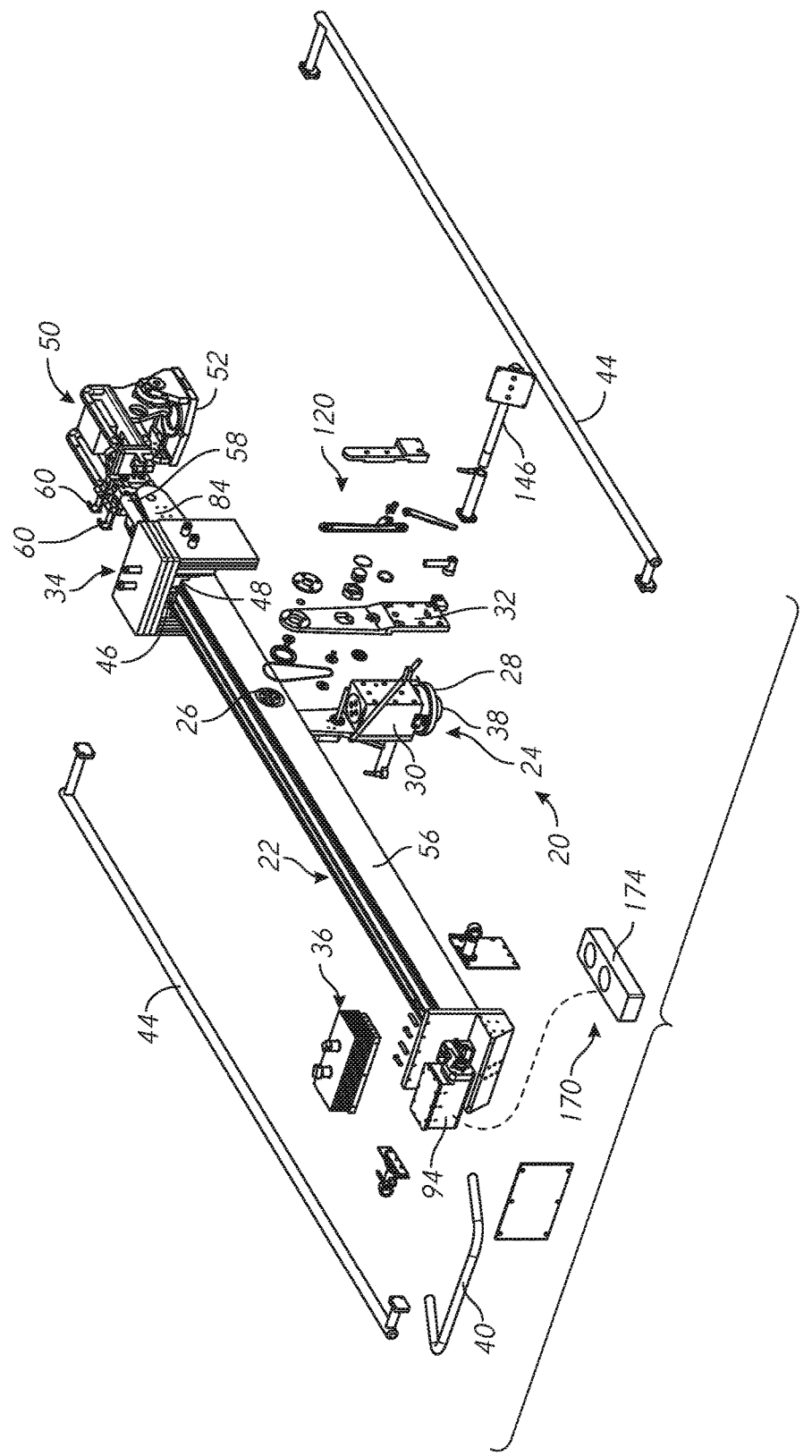
FIG. 2 is an exploded perspective view of the camera crane as it is shown in FIG. 1.
Figure 3:
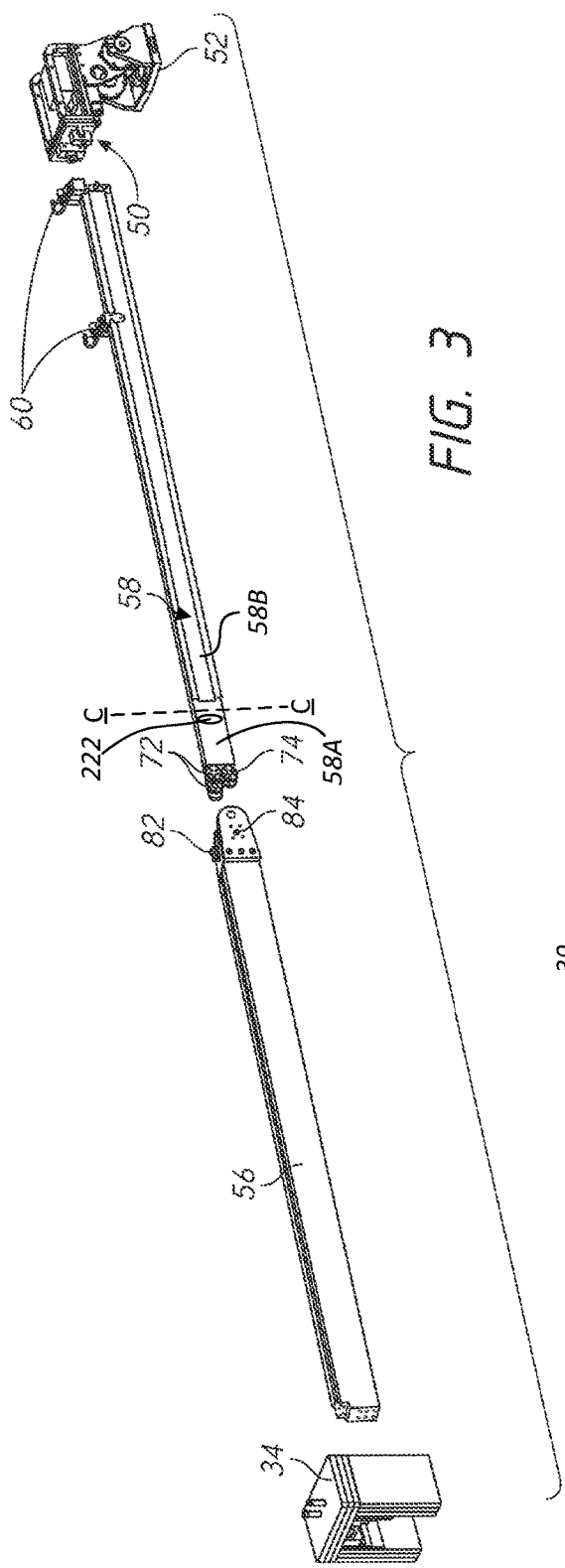
FIG. 3 is a similar exploded perspective view of major elements of the camera crane shown in FIGS. 1 and 2, with components removed for purpose of illustration.
Figure 4:
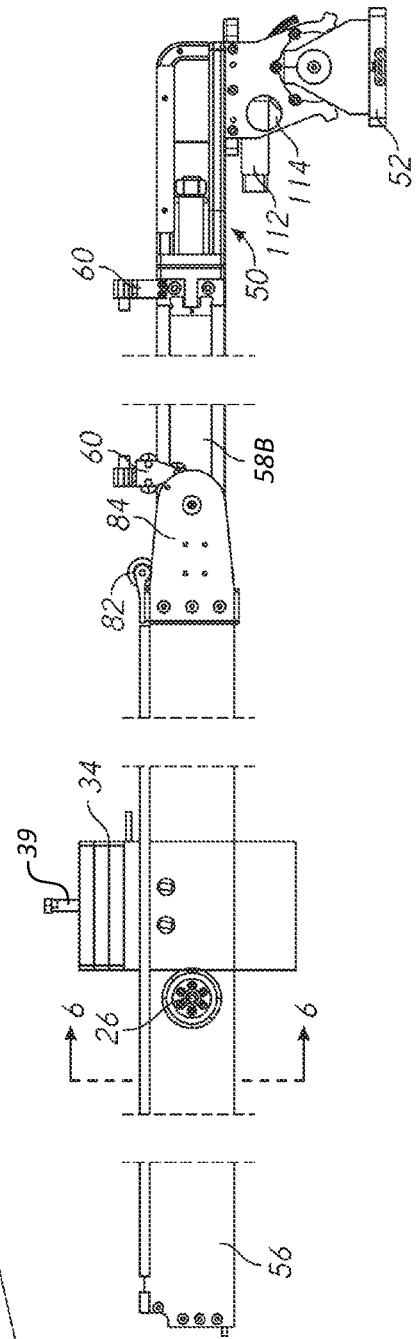
FIG. 4 is a side view of the camera crane of FIGS. 1 and 2 with the base and trim weight platform removed.

As shown in FIGS. 1 and 2, a camera crane 20 has a crane arm 22 including an outer arm 56 and an inner arm 58 telescopically extendible into and out of the outer arm 56. The outer arm 56 is pivotally mounted on a base 24 via left and right axles 26. Handles are attached to the outer arm 56, such as a rear handle 40 and side handles 44, to allow the crane arm 22 to be easily grasped, moved, or held into a desired position. A nose frame 50 is rigidly attached, e.g., bolted, onto the front end of the inner arm. The camera (not shown) is attached to the mounting plate 52. The nose frame 50 may be magnesium, to reduce weight. Referring now also to FIGS. 3 and 4, one or more tilt motors 112 acting through a tilt gear drive or linkage 114 pivot the mounting plate 52 as required to keep the mounting plate (and the camera 172 on the mounting plate) level, regardless of the tilt angle of the crane arm 22.

Figure 13:
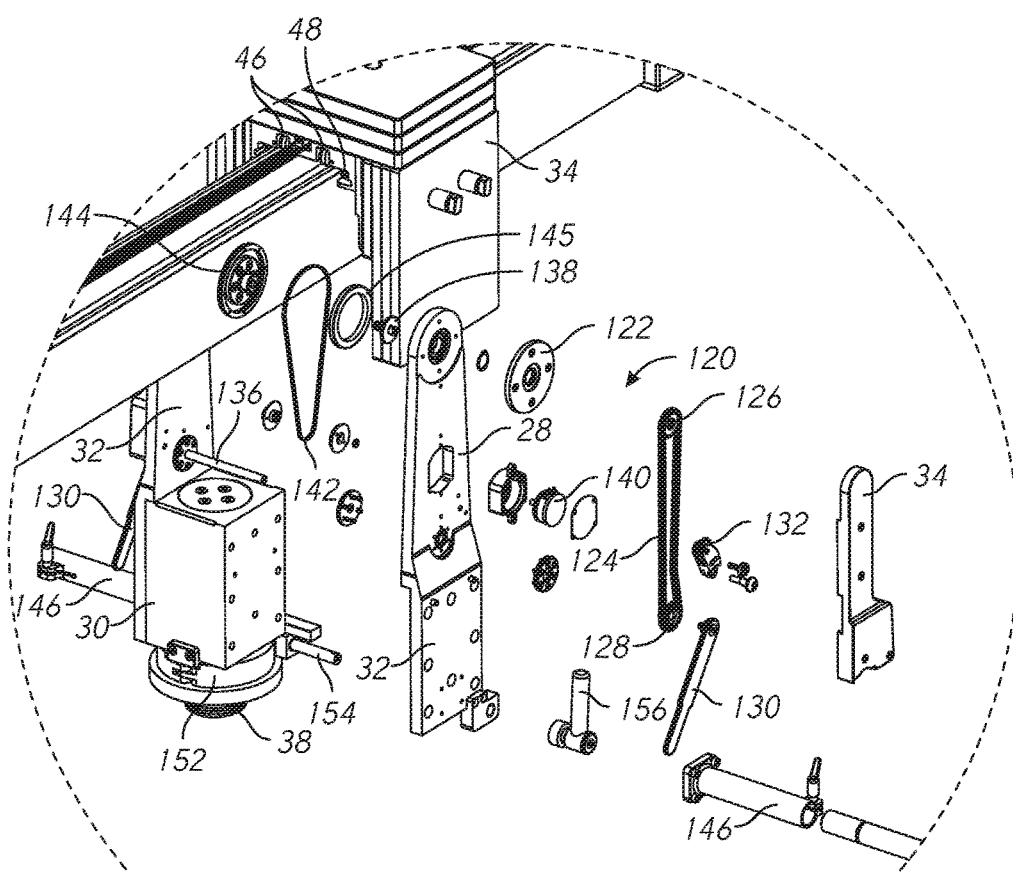
FIG. 13 is a top, rear and right side exploded perspective view of the base shown in FIGS. 1 and 2.

A counterweight carriage 34 rolls on a top surface of the outer arm 56 to keep the crane arm 22 balanced as the inner arm 58 extends and retracts. Specifically, as shown in FIGS. 2 and 13, the counterweight carriage 34 has top carriage rollers 46 which roll on a top surface of the outer arm 56, and side carriage rollers 48 which roll on the sides of the outer arm 56. Rails or tracks may optionally be provided on the outer arm to provide rolling surfaces. The counterweight carriage 34 typically carries a fixed number of counterweight plates selected so that the crane arm is balanced regardless of the position of the inner arm, with a minimum payload or no payload on the mounting plate 52. The weights on the counterweight carriage may be changed as needed if the nose frame 50 is replaced with a heavier or lighter nose assembly.

As shown in FIGS. 1 and 2, a trim weight tray 36 is attached to the back end of the outer arm 56. Trim weight plates may be added to or removed from the trim weight tray to balance the crane arm 22 after the payload is attached to the nose frame 50 and the crane 20 is ready for use. Sliding or rolling trim weights may be provided on the side handles for making small balance adjustments.

Referring now to FIGS. 7-10, an drive motor 102 drives a sprocket 104 through a gear drive 96 within a motor housing 94 at the back end of the outer arm 56. The gear drive 96 may have a drive ratio of 2-6, so that it is back-drivable with a force of about 90 to 225 Newtons applied to the arm, to allow the counterweight carriage to be moved manually. Alternatively, a clutch may be provided in the gear drive to manually disengage the motor from the inner arm, to allow movement of the inner arm by hand without back driving the motor. A first end of a chain 106 is attached to the back end of the counterweight carriage 34 via a first chain anchor 80. The chain 106 wraps around the sprocket 104 with the other end of the chain 106 attached to the back end of the inner arm 58 via a second chain anchor 80, as shown in FIG. 10.

Figure 7:
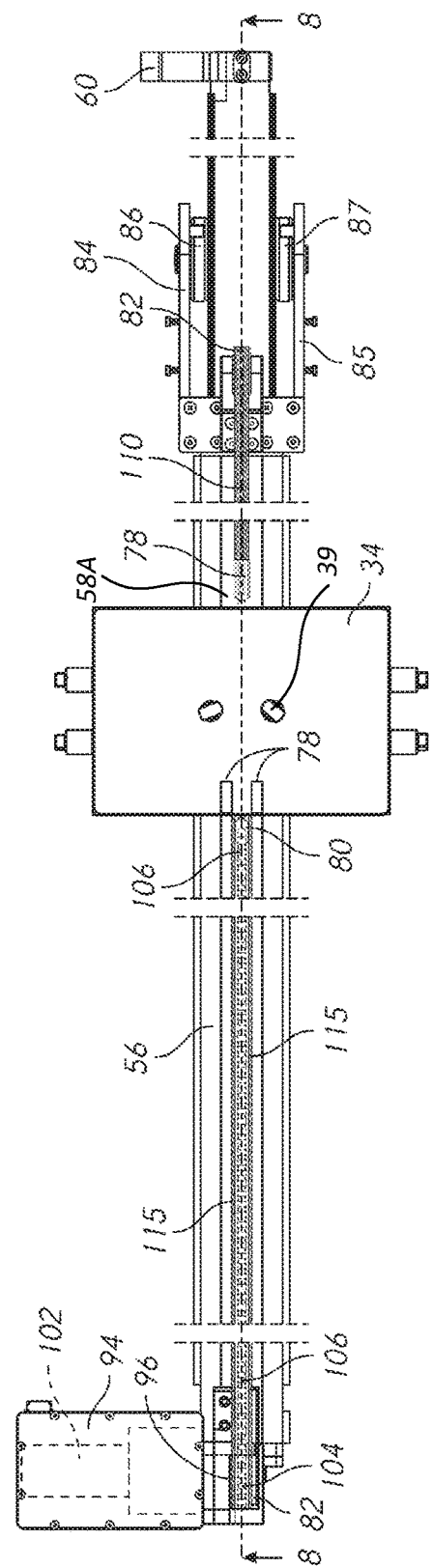
FIG. 7 is a top view of the crane of FIGS. 1-2, showing the crane with the inner arm in a partially extended position.
Figure 17:
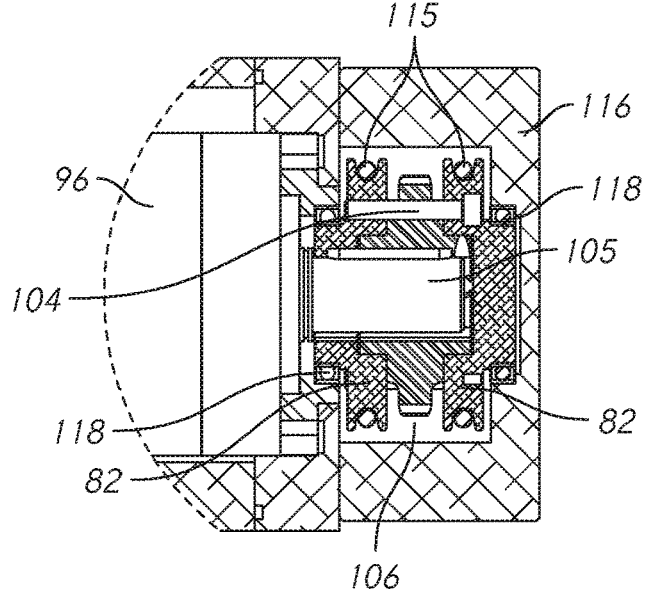
FIG. 17 is an enlarged section view detail of the sprocket and pulleys shown in FIG. 16.

As shown in FIGS. 7, 9 and 17, in the example shown, two rear cables 115 run alongside of the chain 106, with one end of each cable attached to the back end of the counterweight carriage 34 via a cable anchor 78, and with the other end of each cable attached to near the back end of the inner arm. The chain and cable anchors allow tension to be adjusted.

A first end of each of a group of three front cables 110 is attached to a front end of the counterweight carriage 34 via a first cable anchor 78, with the cables running over pulleys 82 on the front end of the outer arm 56, and with second end of each front cable 110 attached to the inner arm 58 via a second cable anchor 78 adjacent to, and in front of, the first chain anchor 80. The chain 106 may be replaced by a belt and the front cables 110 may be replaced by a chain or belt, and varying numbers of cables may be used, depending on the specific design of the crane 20. The drive motor 102 may be powered via an electrical cable connected to batteries or other power supply typically carried on the camera dolly. The drive motor 102 may be controlled via a wireless controller 170 carried by the crane operator, or via a hand control 174 attached or tethered to the crane arm 22.

As shown in FIGS. 11 and 12, upper roller tracks 70 and lower roller tracks 71 are attached to the sides of the inner arm 58. Left front rollers 86 and right front rollers 87 are rotatably attached to left and right front plates 84 and 85, respectively, bolted onto the front end of the outer arm 56. The left and right front rollers 86 and 87 fit between the upper roller tracks 70 and the lower roller tracks 71. Upper inner rear rollers 72 and lower inner rear rollers 74 are rotatably attached to roller brackets 76 on opposite sides of the back end of the inner arm 58. The rollers may be Torlon® polyamide-imide polymer, providing quiet and wear resistant operation. A second pair of left and right front rollers 86 may optionally be provided at the front end of the outer arm 56, providing a total of four front rollers 86.

With the inner arm retracted, the weight of the inner arm, and the weight of the nose assembly and the camera, is supported on the lower roller tracks 71. As the inner arm 58 extends, the load on the inner arm 58 is shifted onto the upper roller tracks 70 supported by the front rollers 86, with the upper inner rear rollers 72 at the back end of the inner arm rolling on the inside top surface of the outer arm 56. Cable supports 60 are captive around and roll on the upper roller tracks 70 to provide intermediate cable support locations for cables running to the camera on the mounting plate 52.

Figure 6:
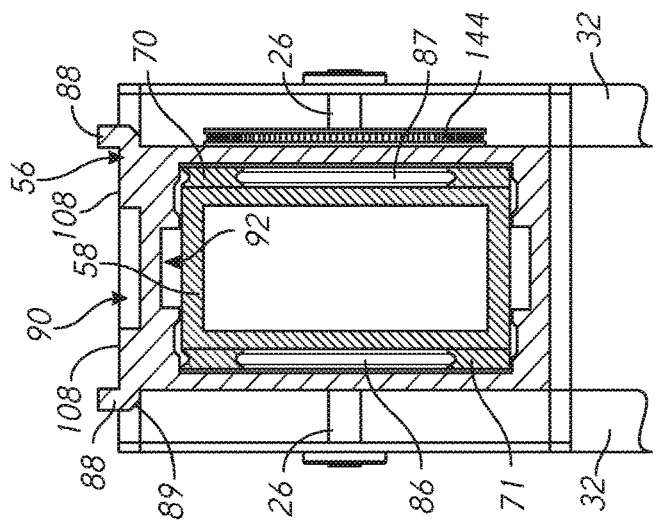
FIG. 6 is a section view taken along line 6-6 of FIG. 4, with the counterweight carriage removed.
Figure 5B:
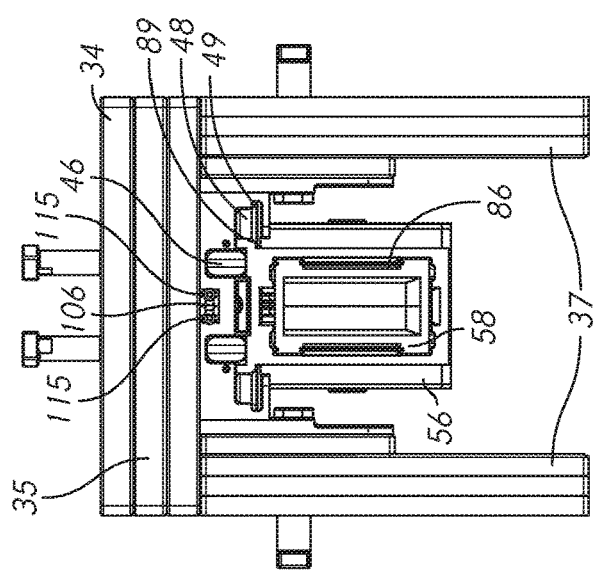
FIG. 5B is a view similar to FIG. 5A but with the nose assembly removed, for purpose of illustration.
Figure 5A:
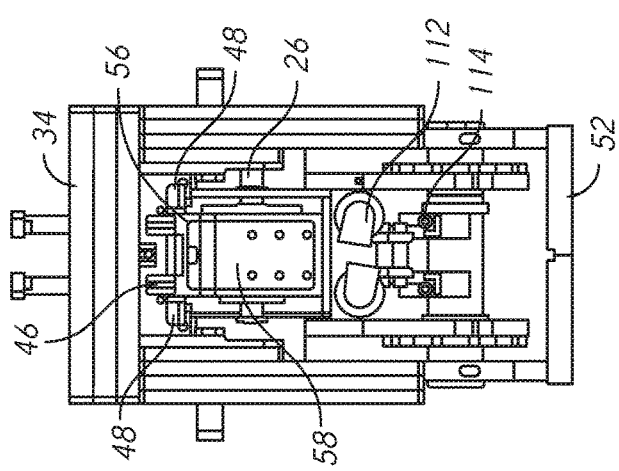
FIG. 5A is a rear view of the camera crane of FIG. 4.

Referring still to FIGS. 6, 11 and 12, the outer arm 56 may be a hollow aluminum extrusion or tube formed as a rectangle with a top channel 90 in the top wall between left and right top flanges 88 and an internal channel 92 under the top channel 90. As shown in FIG. 5, the top carriage rollers 46 roll on the left and right shoulders 108 of the outer arm 56, between the left and right top flanges 88, with the side carriage rollers 48 rolling on the sides of the flanges 88. As shown in FIG. 5B, the flanges 88 have an angle section 89. The side carriage rollers 48 may have a flange 49 which fits under the angle section 89 to prevent the counterweight carriage 34 from lifting up off of the top surface of the outer arm 56. Referring to FIGS. 8-10, the chain 106 and the front cables 110 and rear cables 115 are positioned within the internal channel 92, providing a more compact design.

Figure 14:
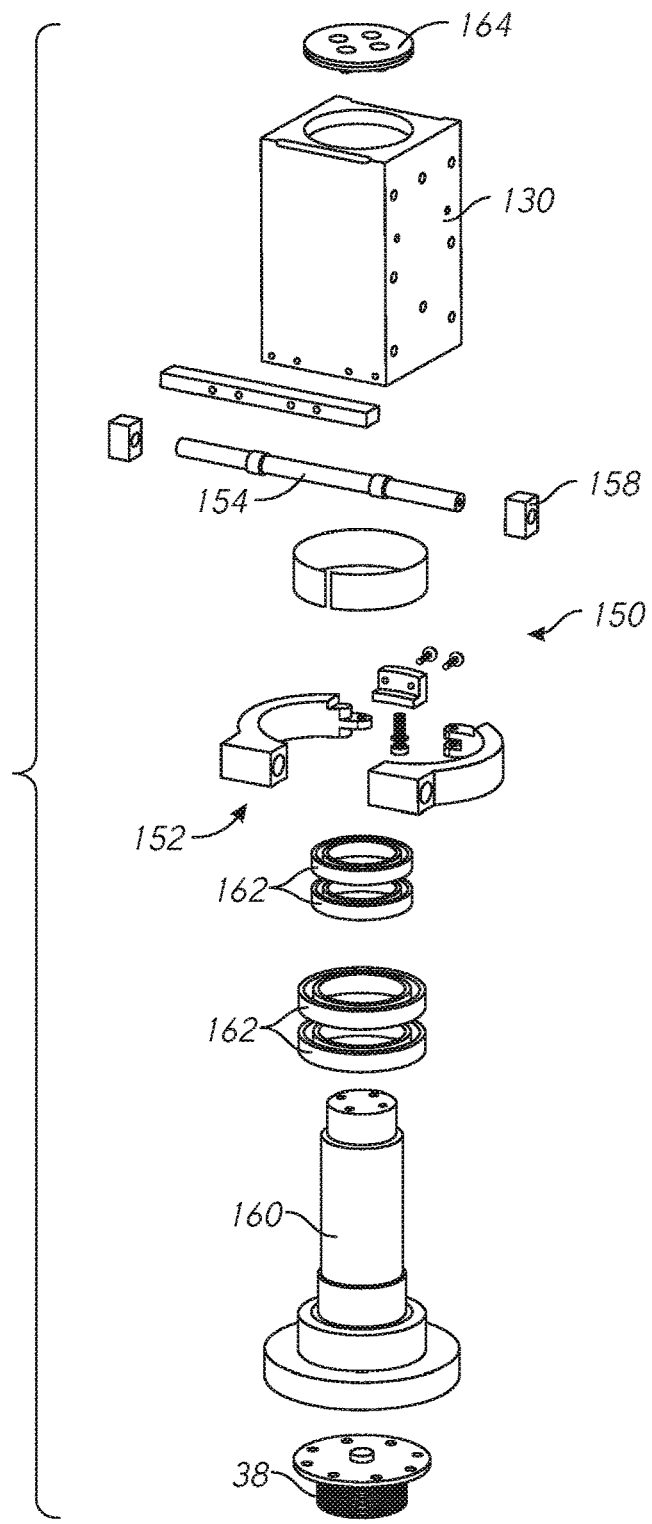
FIG. 14 is a top and front exploded perspective view of the base frame shown in FIG. 13.

Turning to FIGS. 1, 2 and 13, a threaded fitting 38, such as a Mitchel™ mount fitting, is provided at the bottom of the base 24 for attaching the base 24 onto a supporting structure, such as a column of a camera vehicle or onto the arm of a camera dolly. As shown in FIG. 14, a base frame 30 is rotatably supported on a center post 160 via pan bearings 162, with the pan bearings 162 held in place via a frame cap 164 bolted onto the upper end of the center post 160.

In FIG. 13, the left and right base plates 28 and 32 are bolted onto the sides of the base frame 30. The axles 26 on the outer arm 56 extend into bearings at the upper ends of the base plates, so that the crane arm 22 is pivotally attached to the base 24 and can tilt up and down. An encoder chain 142 extends around a crane arm sprocket 144 fixed to the right side of the outer arm 56 around the axle 26, and around an encoder sprocket on a rotary encoder 140 on the right base plate 32. The rotary encoder 140 senses the tilt angle of the crane arm 22 and provides a tilt angle signal to a controller which controls the tilt motors 112 to keep the mounting plate 52 level as the crane arm 22 tilts up and down.

A right tilt brake assembly 120 includes a brake sprocket 126 and a lever sprocket 128 both rotatably mounted on the right base plate 32 and connected via a brake chain 124. An idler 132 maintains tension on the brake chain 124. A brake lever is rigidly attached to the lever sprocket 128. The brake sprocket 126 is mounted on a lead screw thread on a tension shaft 138 on the right base plate 32. A brake plate 122 is positioned between the brake sprocket 126 and the outside of the right base plate 32. A brake ring 145 is positioned between the inside of the base plate and the outer arm. The brake ring 145 may be Delrin acetal resin. The brake sprocket 126 and the lever sprocket 128 and the brake chain 124 are covered via a chain cover 134.

Although FIG. 13 largely shows the right side of the tilt brake assembly 120, the same components as described above are provided on the right base plate 32. Specifically, a left tilt brake assembly 120 on the left base plate has an upper left tilt brake sprocket 126 co-axial with the left axle, a lower left tilt brake sprocket spaced apart from the upper left tilt brake sprocket, a left tilt brake chain connecting the upper and lower left tilt brake sprockets, and a left tilt brake lever rigidly attached to the lower left tilt brake sprocket, with movement of the left tilt brake lever braking pivoting movement of the outer arm on the base. The right tilt brake assembly 120 may be a mirror image of the left tilt brake assembly 120.

A tilt brake lever axle 136 connects the lever sprockets on the left and right sides. Pulling either the left or right brake lever 130 rotates the lever sprocket 128, which rotates the brake sprocket 126, causing the brake sprocket 126 to move inwardly on the tension shaft, compressing the brake ring 145 between the outer arm and the top end of the right base plate 32. This movement exerts braking force on both sides of the outer arm 56, without acting on the axle bearings. The tilt brake assembly may be used to slow tilt movement of the crane arm 22, or to lock the crane arm at a fixed tilt angle. As shown in FIG. 13, the tilt brake assembly 120 has a minimum width to allow the side weights on the counterweight carriage 34 to pass over the tilt brake assembly without interference.

In FIG. 13, a monitor support 146 is bolted onto the right base plate 32 for supporting a monitor 176 providing an image from the camera to the camera operator and/or the crane operator. The monitor consequently pans with the crane arm 22, allowing the operators to more easily view the image from the camera continuously. With the monitor in constant view from the side of the crane arm 22, and with controls for the camera and for the drive motor at or near the back of the crane arm 22, or on a hand held unit, the camera and the crane 20 may be entirely controlled by a single operator. A second monitor support may be provided on the left base plate 28. The monitor support may extend telescopically outward to allow the monitor to be positioned further to one side of the crane, as may be desired.

Referring to FIGS. 13 and 14, a pan brake assembly 150 has a split collar 152 around the center post 160, which is rigidly attached to the base frame 30. A pan brake rod 154 extends through the split collar 152 and is threaded into followers 158 having left and right hand screw threads. A pan brake lever 156 is attached to one or both sides of the pan brake rod 154. Turning the pan brake lever 156 drives the followers 158 towards each other, causing the split collar 152 to clamp onto the center post 160, braking panning movement of the crane arm 22. The pan brake assembly 150 may be used to slow panning movement of the crane arm 22 about the base 24 or to lock the crane arm 22 against any panning movement. Top weights 35 and side weights 37 may be placed on the counterweight carriage 34, with the side weights 37 having a lower end extending below a bottom surface of the outer arm 56, and with the pan brake rod 154 below the lower ends of the side weights 37. As a result, pan brake assembly does not interfere with movement of the counterweight carriage 34.

Figure 15:
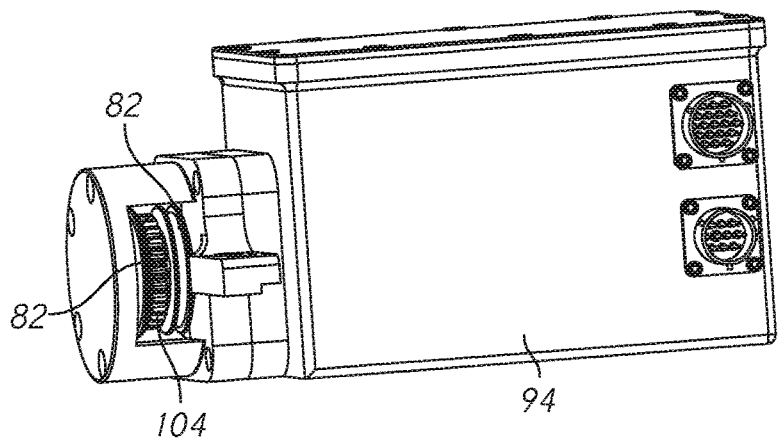
FIG. 15 is a front, top and right side perspective view of the motor housing shown in FIGS. 2 and 9.
Figure 16:
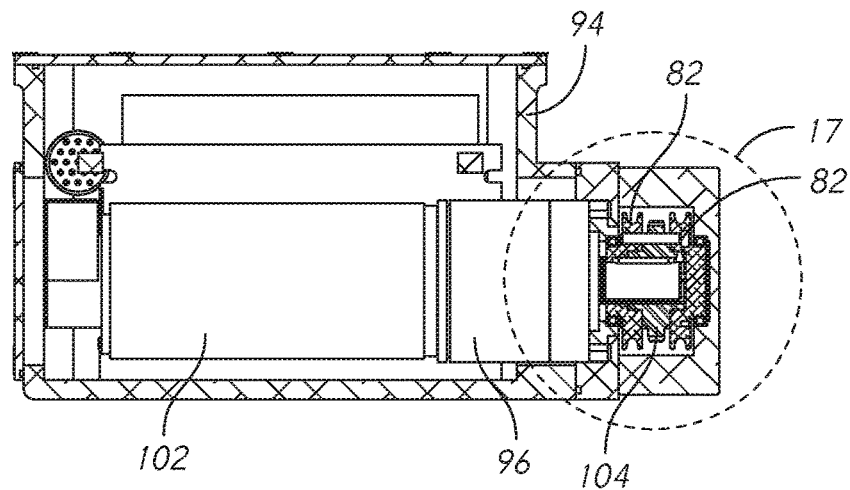
FIG. 16 is a section view of the motor housing shown in FIG. 15.

Turning to FIGS. 15, 16 and 17, the sprocket 104 is attached to the output shaft 105 of the gear drive 96. The gear drive 96 may have a gear ratio which is low enough to allow back driving the drive motor 102. This allows the inner arm to be manually extended or retracted, e.g., by pushing or pulling on the counterweight carriage by hand, if electrical power is not available. The pulleys 82 alongside of the sprocket 104 have bearings supported on a pulley housing 116 attached to the motor housing 94. Consequently, the radial loading on the output shaft 105 is reduced because only the tension of the chain 106, and not the tension of the rear cables 115, is applied to the output shaft 105. The load on the internal shafts and bearings of the drive motor 102 and the gear drive 96 are reduced, which reduces wear and noise. The tension load on the chain 106 is also reduced as the tension in the rear cables 115 offsets a majority of the tension in the front cables 110.

In use, the crane arm 22 is mounted on a camera dolly or pedestal. In designs having a two meter telescoping movement, the crane arm 22 is light enough to be lifted by a camera crew. The crane arm 22 can therefore be mounted on a camera dolly without lifting equipment. The crane arm 22 is typically first locked into a horizontal position, either via the tilt brake or via a strut temporarily attached to the base frame 30 and to the crane arm 22. A camera is attached to the mounting plate and the crane arm 22 is balanced as described above. The crane arm 22 is positioned as desired via a crane operator grasping the handles and pushing or pulling the crane arm.

The inner arm 58 is telescopically extended using a wired or wireless control which controls the drive motor 102.

When the motor is actuated to extend, the drive motor 102 turns the sprocket 104 counterclockwise in FIG. 8. The chain 106 pulls the counterweight carriage 34 towards the rear of the crane arm 22. Simultaneously, the front cables 110 pull the inner arm forward, extending the inner arm. The drive motor 102 and gear drive 96 may be selected so that they can be readily back-driven, by pushing or pulling on inner arm 58 with a nominal force of e.g., 90 to 225 N. This allows the inner arm 58 to be manually telescopically moved in or out, without using the motor.

The arm is retracted by operating the drive motor 102 in the reverse direction, with the chain 106 pulling the inner arm back into the outer arm, and with the front cables pulling the counterweight carriage towards the front of the crane arm 22. One or more shock absorbers may be provided on the counterweight carriage or at front and rear stop positions on the outer arm 56, to prevent the counterweight carriage from making a hard impact at the front or rear limit of travel. The electronic controller of the drive motor 102 may also be linked to sensors which detect the position of the counterweight carriage, to decelerate the counterweight carriage automatically as it approaches the front or rear limit of travel. In the example shown with an outer arm 56 about length of about 300 cm, the inner arm travel is about 215 cm.

The example shown in the drawings having 2 meters of extension travel weighs about 170 kg. Typical crane weights using the design shown are 120 kg to 200 kg. The same design principals may of course be used to provide even lighter designs, having less extension. Since the crane arm 22 has only a single moving arm, the weight and complexity of additional rollers, cables and other components associated with having two or more moving arms, is avoided. The crane arm 22 also provides a more simple design which may be manufactured with fewer components and steps, and which may be provided at lower cost compared to existing designs. As described above, the inner arm 58 is supported within the outer arm only by the front rollers 86 and the rear rollers 72 and 74, with no intermediate rollers used.

Figure 18:
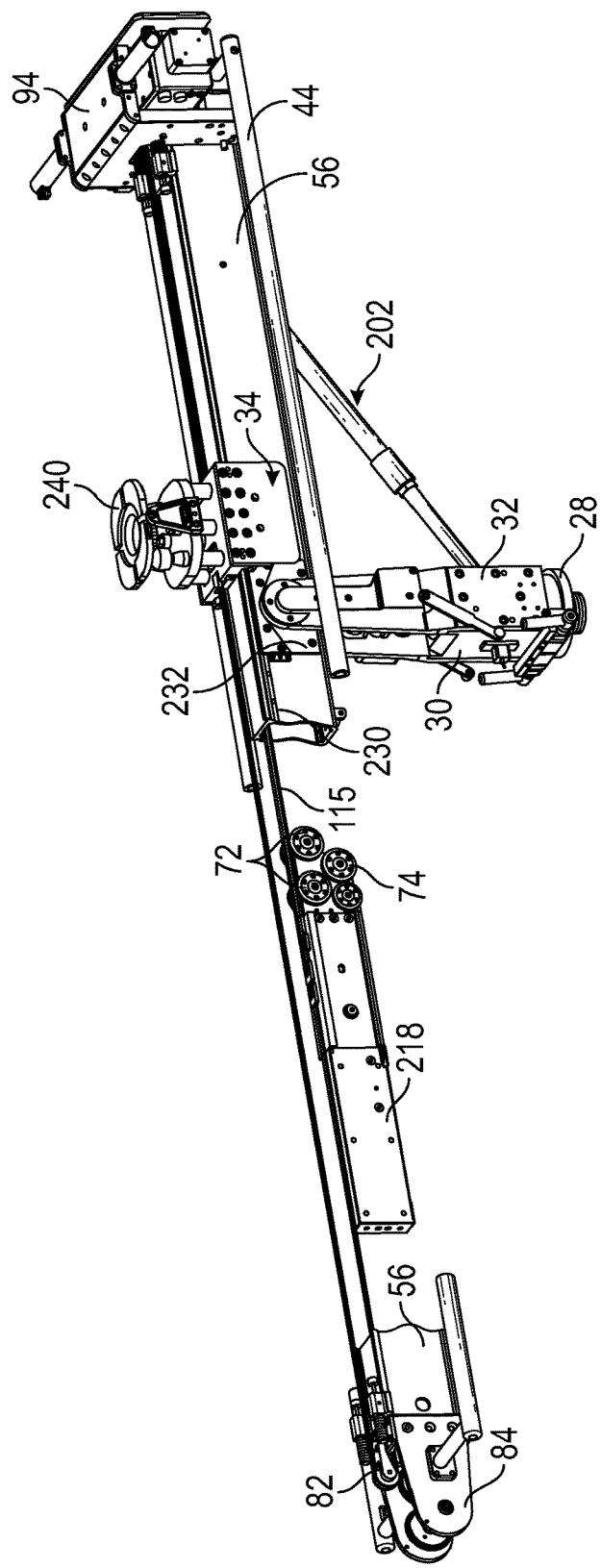
FIG. 18 is a perspective view of a camera slider, with the outer arm cut away for purpose of illustration.
Figure 19:
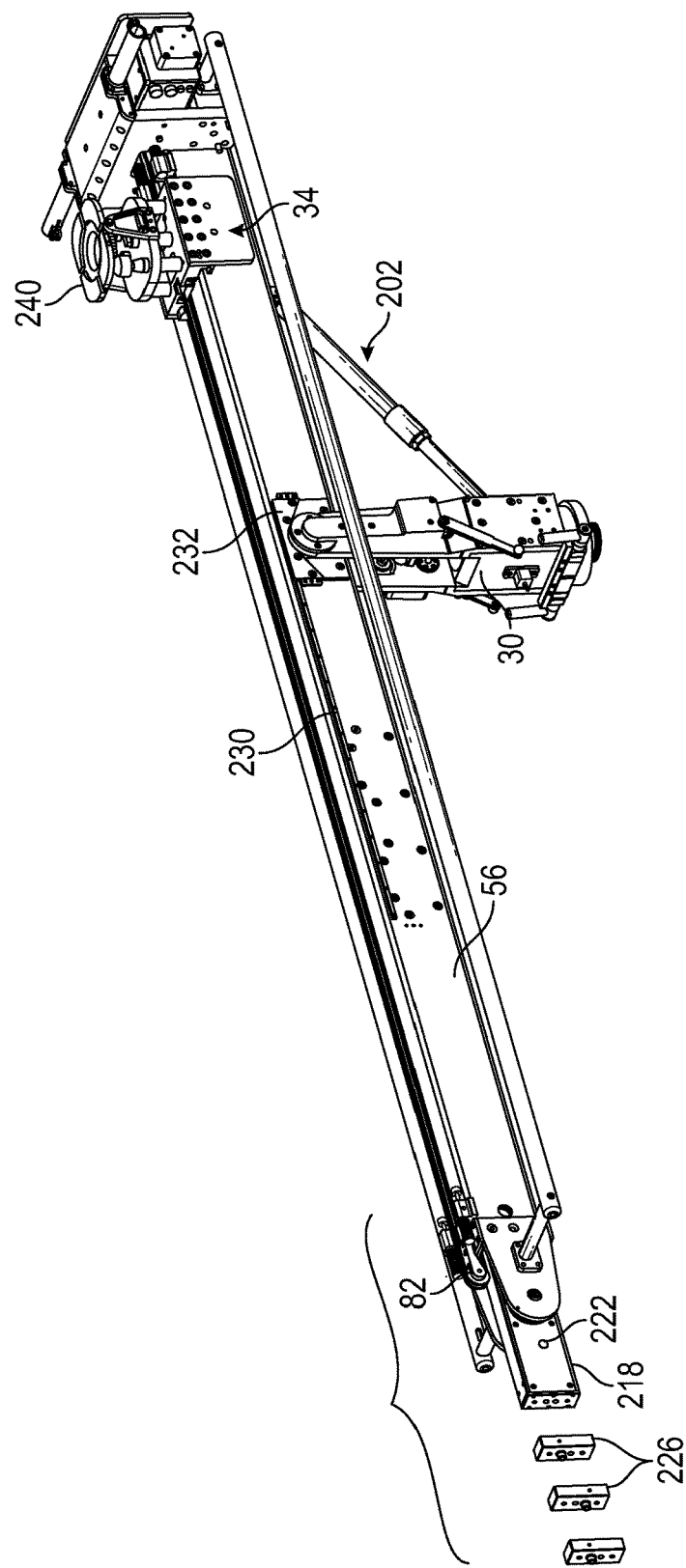
FIG. 19 is a partially exploded perspective view of the camera slider shown in FIG. 18.
Figure 20:
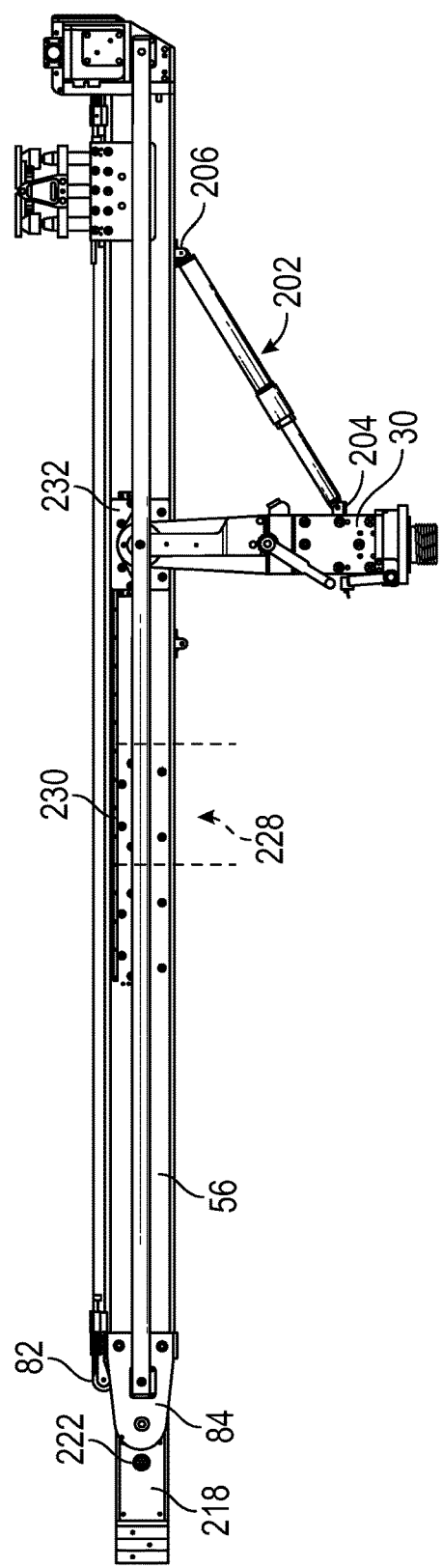
FIG. 20 is a side view of the camera slider shown in FIG. 19.
Figure 23:
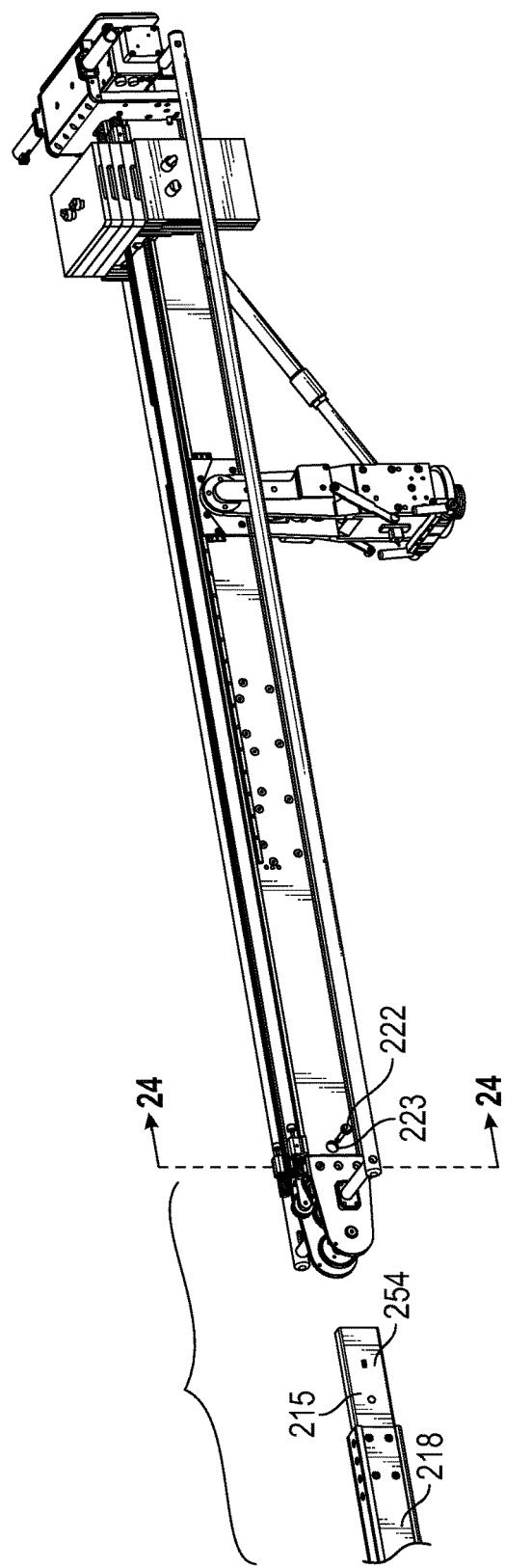
FIG. 23 is a perspective view illustrating installation of the slider counterweight shown in FIG. 22 onto the telescoping camera crane shown in FIGS. 1-17
Figure 24:
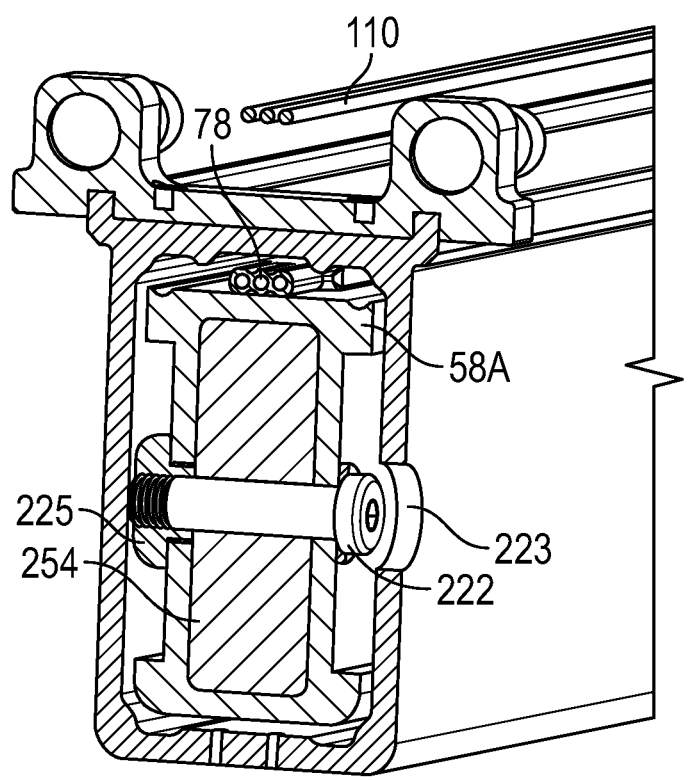
FIG. 24 is a perspective section view taken along line 24-24 of FIG. 23.

As shown in FIGS. 18, 19 and 20, the camera crane shown in FIGS. 1-17 may optionally be converted for use as a camera slider. In this design, the inner arm 58 is split into a rear segment 58A and a front segment 58B, as shown in FIGS. 3 and 8. Referring to FIGS. 23 and 24, the front segment 58B has an insert section 254 dimensioned to slide into the front open of the rear segment 58A. The front segment 58B is installed into the rear segment 58A by sliding the insert section 254 of the of the front segment 58B into the rear segment 58A, and then securing them together with a segment bolt 222 passing through a hole 215 in the insert section 254 and threaded into a nut 225 fixed onto the rear segment 58A.

The rollers 72 and 74 remain on the back end of the rear segment 58A, in the same way as in the design where the inner arm is not split into front and rear segments. Similarly, the cables 110 remain attached onto the rear segment 58A, in the same way as they are in the design where the inner arm is not split into front and rear segments. As also shown in FIG. 24, a front stop plate with resilient bumpers may be attached onto the front end of the outer arm, to provide a forward stop position for the counterweight carriage, with a similar rear stop plate attached to the back end of the outer arm.

Figure 22:
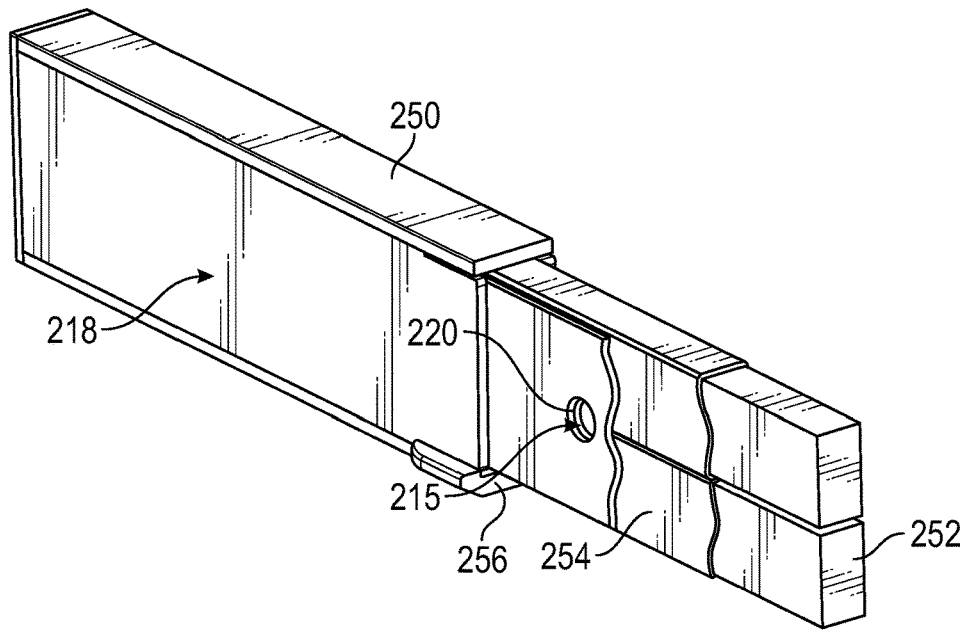
FIG. 22 is a rear perspective view of the slider counterweight shown in FIGS. 18-20.

To convert the camera crane 20 into a camera slider 200, the front segment 58B is replaced with a slider counterweight 218 shown in FIG. 22. The slider counterweight 218 is much shorter than the front segment 58B of inner arm 58, e.g., 5 to 30% of the length of the inner arm 58. With the counterweight carriage 34 at the full back position, the slider counterweight 218 may protrude forward of the front plates 84 by only a short length, typically about 10 to 15 cm. Alternatively, the slider counterweight may be designed so that it is contained within the outer arm 56 at all times.

As shown in FIG. 22, the slider counterweight 218 may be formed of welded plates 250 with lead weights 252 contained in the insert section 254 of the slider counterweight 218. The insert section of the front segment 58B has the same size and shape as the insert section 254 of the slider counterweight 218, so that they may be interchangeably installed onto or into the rear segment 58A of the inner arm 58. The insert sections 254 may have an internal reinforcing tube 220 around the segment bolt hole 215, to allow the segment bolt 222 to be securely tightened without deforming the rear segment 58A or the insert section of the front segment 58B, or the insert section 254 of the slider counterweight 218. A low friction bottom slide bushing 256 may be provided on the bottom of slider counterweight 218 to provide a low friction surface between the slider counterweight 218 and the outer arm 56, if needed. FIG. 18 is drawn with the outer arm 56 partially cut away to show the crane 20 converted into a camera slider 200, with the front segment 58B of the inner arm removed and replaced with the slider counterweight 218.

Figure 21:
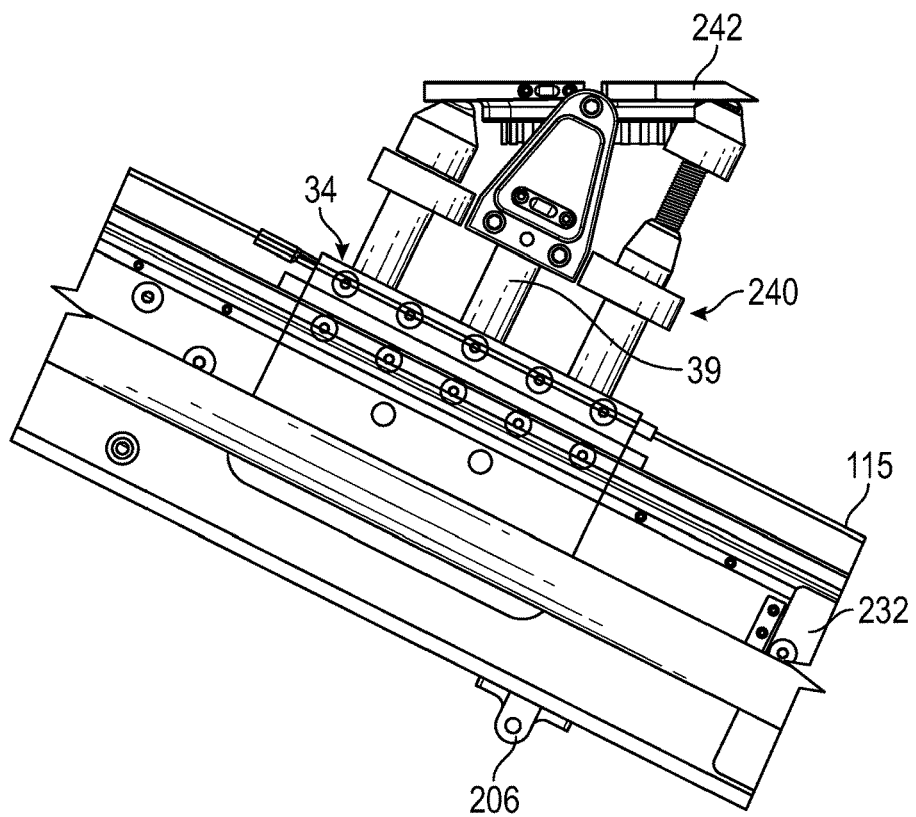
FIG. 21 is an enlarged detail view of the leveling head shown in FIGS. 18-20.

As shown in FIG. 21, a camera mounting plate 242 on a manual leveling head 240 may be adjusted to level using jacking screws, to position the camera in a level orientation, where the crane arm 22 is at an inclined orientation, as in the example shown. The leveling head 240 may be attached onto the counterweight carriage 34 via the weight bolts 39 shown in FIG. 8, which are used to hold the top weights 35 in place. In the camera slider configuration, some or all of the top weights 35 may be removed since with the crane 20 set up as a camera slider, bending moments on the arm are minimal because the payload, i.e. the leveling head 240, the camera, and any accessories on the counterweight carriage, travels only along the length of the outer arm 56. Referring to FIG. 19, adjustment weights 226 may be removably attached onto the front end of the slider counterweight 218 to balance the crane arm 22, after the payload is mounted onto the weight carriage 34, or the leveling head 240, if used.

Figure 25:
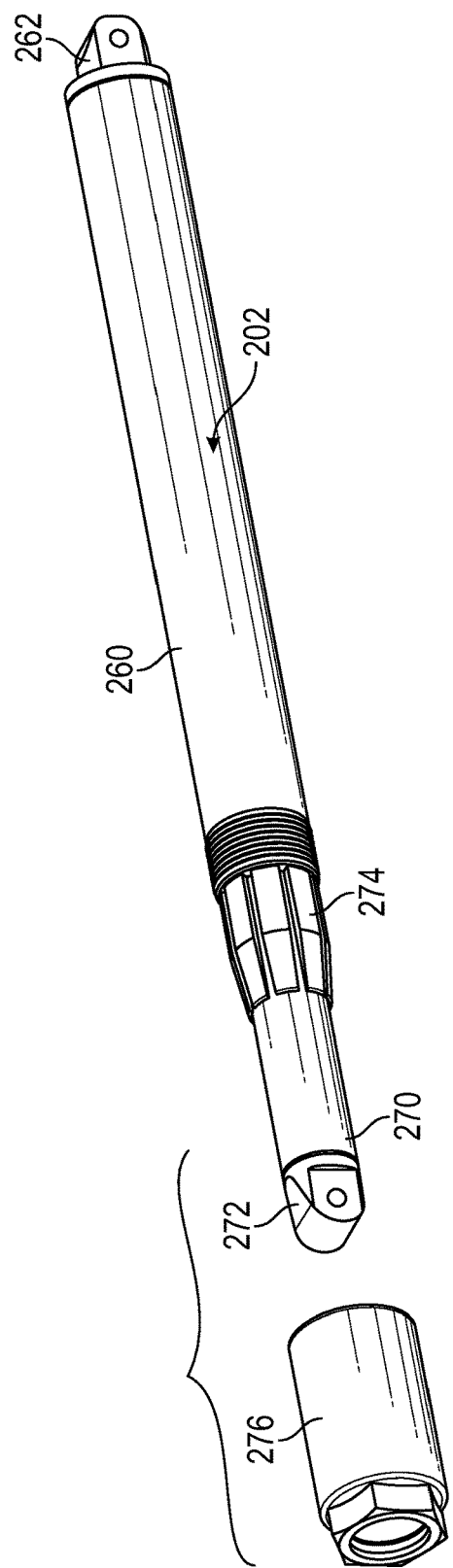
FIG. 25 is a perspective view of the telescoping locking strut shown in FIGS. 18-20.
Figure 26:
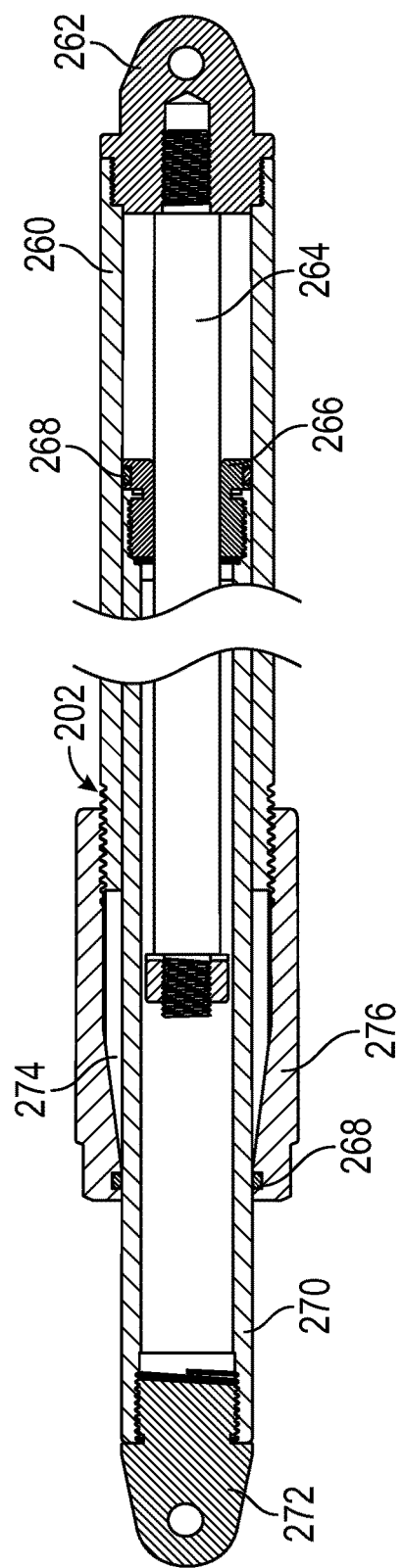
FIG. 26. is a section view of the telescoping locking strut shown in FIG. 25.

As shown in FIGS. 20, 25 and 26, a telescoping locking strut 202 may be pivotally attached to the base via a base clevis 204, and also pivotally attached to the outer arm 56 via an arm clevis 206, as shown in FIG. 20. The telescoping locking strut 202 may have an outer tube cap 262 attached to a top end of an outer tube 260, with a rod 264 attached to the outer tube cap 262. An inner tube 270 is telescopically slidable into and out of the outer tube 260 on a collar 266 around the rod 264, and with the collar attached to top end of the inner tube 270. An inner tube cap 272 is attached to the bottom end of the inner tube 270. A collet 276 is threaded onto the bottom end of the outer tube 260. Tightening the collet 276 presses fingers 274 at the bottom end of the outer tube 260 onto the inner tube 270. O-rings 268 may be provided between the collet 276 and the inner tube 270, and between the collar 266 and the outer tube 260. The collet 276 may be tightened to increase sliding friction between the inner and outer tubes, or even locking the strut 202 against any telescoping movement.

To convert the crane 20 from a telescoping camera crane as shown in FIGS. 1-18, to a camera slider as shown in FIGS. 18-27, the counterweight carriage 34 is moved to the full back position as shown in FIG. 19. This movement may be achieved via controlling the drive motor 102, or it may be done manually be pushing on the counterweight carriage 34 by hand, in designs that allow back-driving the motor. With the counterweight carriage 34 at the full back position, the inner arm 58 is fully extended, and the segment bolt 222 is aligned with a tool clearance hole 223 in one sidewall of the outer arm 56. A tool is inserted through the tool clearance hole 223 into engagement with the segment bolt 222, and the segment bolt 222 is unscrewed from the nut 225 and withdrawn. The front segment 58B of the inner tube is then pulled out of the rear segment 58A and removed from the crane 20. The slider counterweight 218 is installed in place of the front segment 58B using the reverse sequence of steps. Since only the single segment bolt 222 is used, converting the crane 20 between the telescoping crane configuration of FIG. 1-17, and the camera slider configuration 200 of FIGS. 18-27, is fast and simple to perform.

Typically a camera head is mounted onto the counterweight carriage 34 to provide greater versatility, although in some cases the camera may be attached directly onto the counterweight carriage 34, and the camera head omitted.

In use as a camera slider, control of the drive motor 102, either via a wireless handheld controller, or via a tethered controller, or a controller on the crane 20 itself, moves the weight carriage 34 along the top surface of the outer arm 56. At the same time, the slider counterweight 218 moves by an equal amount in the opposite direction. This provides a balanced slider. As a result, the crane arm 20 may be inclined or horizontal, and moving the payload along the top of the outer arm occurs without weight transfer.

With the crane 20 converted to the slider configuration of FIGS. 18-27, it may be used in a much smaller space in comparison to the crane 20 in the telescoping crane mode as shown in FIGS. 1-17, because the fully extended length of the crane arm 20 is reduced by removing the front segment 58B of the inner arm 58. A known problem with conventional camera sliders is that they transfer weight when they slide a camera back and forth along the length of the track, which can create a destabilizing imbalance. With the crane 20 in the slider configuration 200, the crane 20 remains balanced, and it can be used on small camera dollies without risk of imbalance. With the crane 20 in the slider configuration 200, the overall weight of the crane can also be reduced typically by more than 40 or 50% as the front segment 58B of the inner arm is removed, along with the counterweights needed to balance the crane arm 20 when it is in the telescoping crane configuration shown in FIGS. 1-17.

By releasing the tilt brake assembly 120, the outer arm 56 can be tilted up or down to provide a camera slider that can be adjusted to different angles rather than just horizontal position. The outer arm 56 can also be locked at any angle via the 276 collet on the telescoping locking strut 202. In the slider configuration shown in FIGS. 18-27, the crane arm 22 remains balanced regardless of the position of the counterweight carriage 34. As the outer arm 56 is mounted on the base 24, it can pan and tilt, without having to add accessories or equipment. This provides a time saving feature.

The telescoping locking strut 202 allows the crane arm 20 to be locked at any angle, including the conventional horizontal position typically used for camera sliders. The collet 276 may be tightened or loosened to set a limit on the force exerted on the crane arm 20, to avoid over-stressing components of the arm. The collet 276 may be tightened sufficiently to rigidly lock the crane arm 20 in a fixed position. This allows for slider operation with the crane arm 20 at any angle from about 15 or 20 degrees down to about 25 to 35 degrees up, generally with a total elevation angle range of 45 to 55 degrees.

The telescoping locking strut 202 can be loosened to allow telescoping action to occur, and it need to be removed in slider operation. The telescoping locking strut 202 may also provide positive tilt angle end stop positions. The telescoping locking strut 202 is locked or unlocked by manually rotating the collet 276. Telescoping movement of the telescoping locking strut is largely silent due to the o-rings 268 between the moving surfaces. When the collet is tightened the o-rings may be compressed until there is metal-to-metal contact, at which point there is no movement, and therefore no noise.

Figure 27:
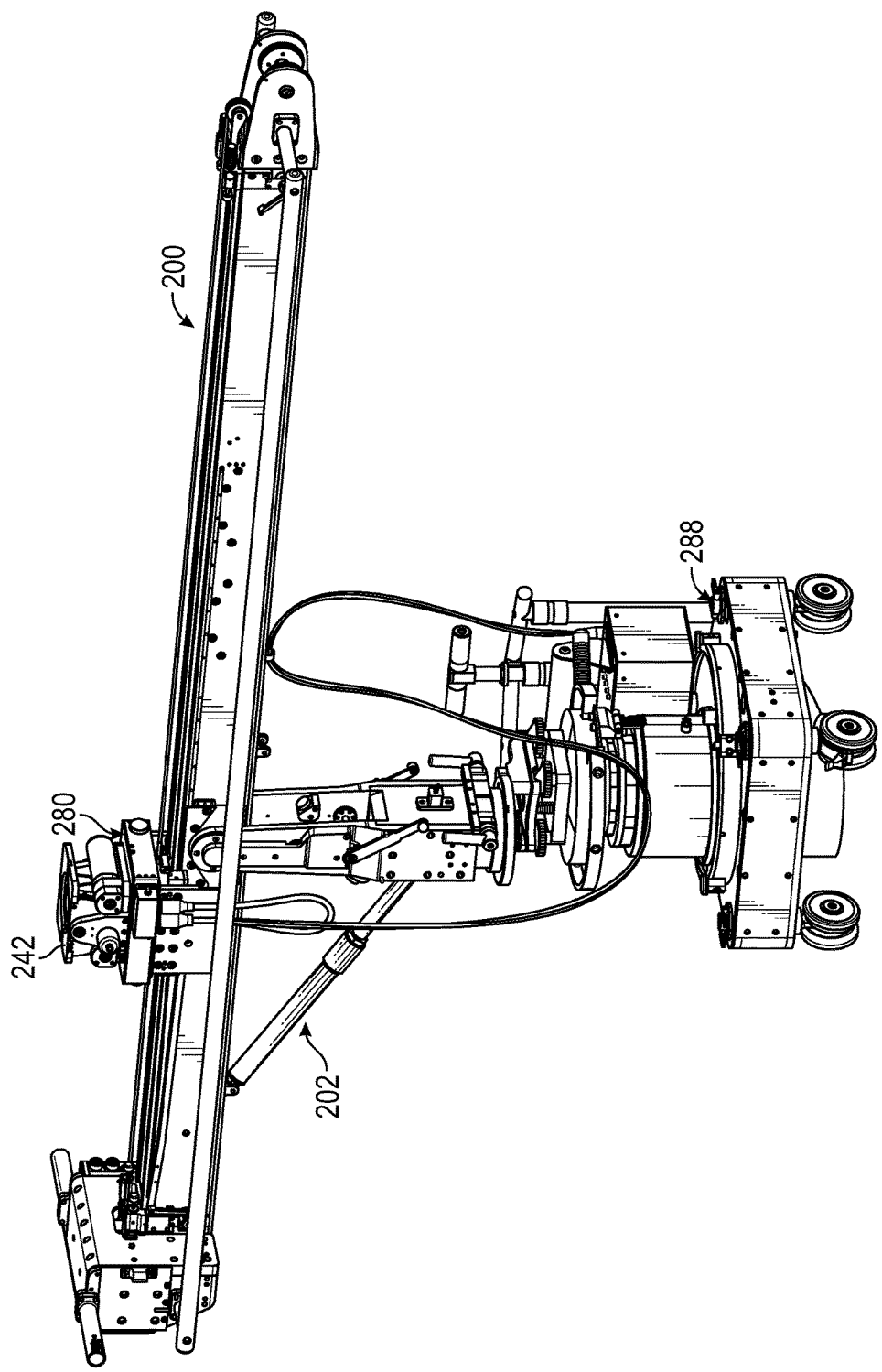
FIG. 27 is a perspective view of the camera slider of FIGS. 18-20 in use.

As shown in FIG. 27, the camera slider 200 may include an automatic or motorized camera head 280. In this case, optionally both the sliding movement and pan and tilt movement of the camera, may be controlled either automatically by an electronic computer controller, or manually via a joystick or other interface, at the preference of the user. The computer controller may operate to control pan axis movement provided by the first electric motor, and tilt axis movement provided by the second electric motor, on the motorized camera head 280 to keep the camera level while the crane arm 20 tilts, or to keep the camera fixed on a subject while the crane arm pans. Optionally, the tilt motors 112 shown in FIG. 4 for telescoping crane use may be provided as a module which can also be used on the motorized camera head 280. In this case no additional electronic cabling is needed for the conversion from crane operation to slider operation.

As shown in FIGS. 20 and 21, the outer arm 56 may have left and right side rails 230 supported on left and right rail plates 232 pivotally supported on the base 24 via the axle 26. The outer arm 56 may be shifted to the front or back, relative to the base 24, by loosening rail plated bolts or brakes, and then sliding the outer arm 56 relative to the base 24, with the weight of the outer arm carried by side rails 230. This provides alternative mounting positions 228 of the outer arm 56 on the base 24.

A method for filming or recording moving images using the camera slider 200 as described above includes removing a front segment of an inner arm from a rear segment of the inner arm of the telescoping camera crane 20, by withdrawing the insert section of the front segment of the inner arm from the rear segment of the inner arm. The front segment of the inner arm is then replaced with the slider counterweight by inserting an insert section of the slider counterweight into or onto the rear segment of the inner arm. For this purpose the insert section of the slider counterweight may have the same shape and dimensions as the insert section of the front segment of the inner arm. The slider counterweight typically has a length 5 to 30% of the length of the front segment of the inner arm. In most cases a camera head is mounted onto the counterweight carriage 34 which is supported on the outer arm on carriage rollers. The drive motor is operated to move the counterweight carriage linearly along the top of the outer arm in a first direction, which simultaneously moves the counterweight carriage in a second direction, opposite to the first direction, so that the camera slider 200 remains balanced.

Figure 28:
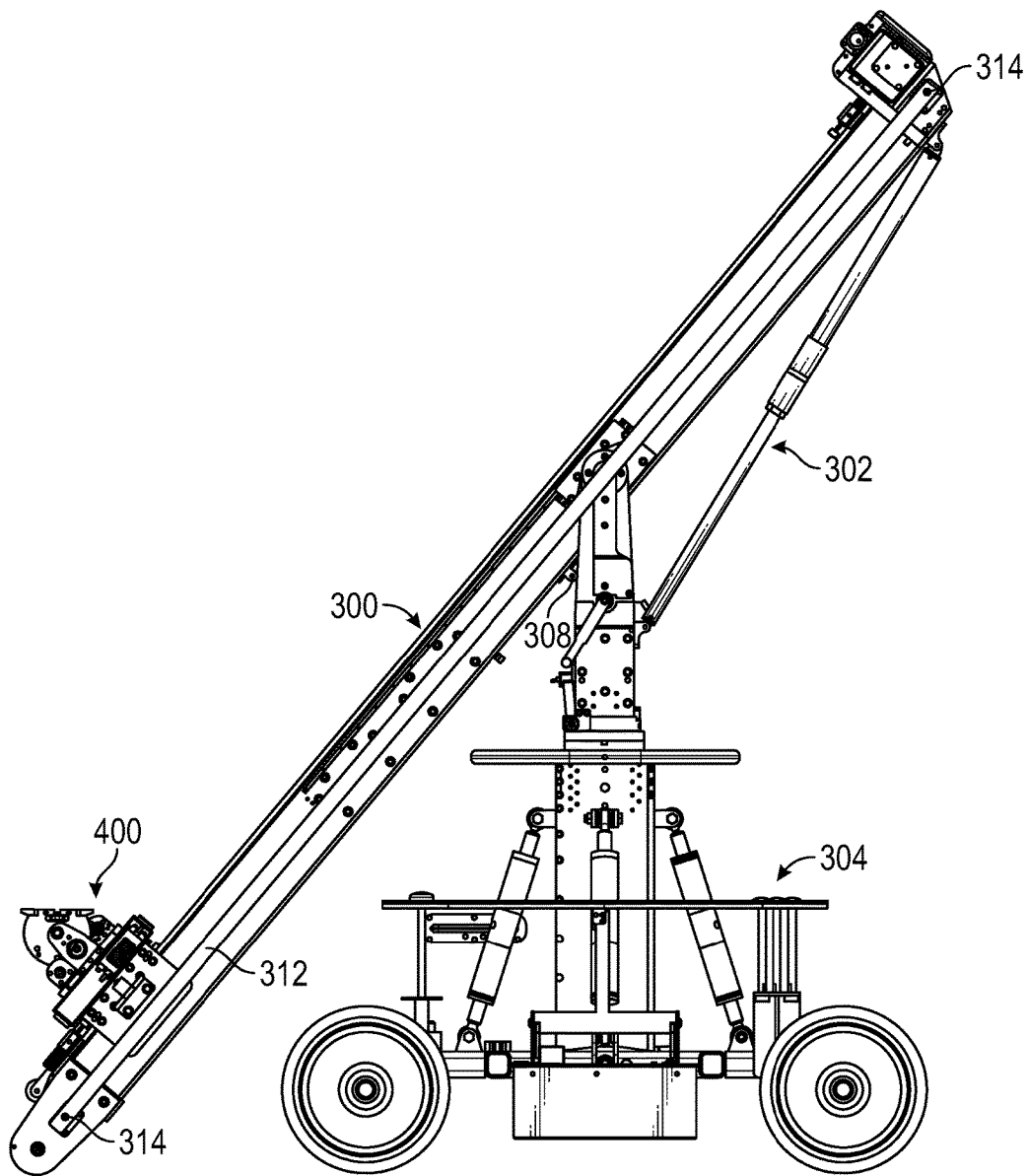
FIG. 28 is a side view of an alternative camera slider embodiment shown in the full down position.
Figure 29:
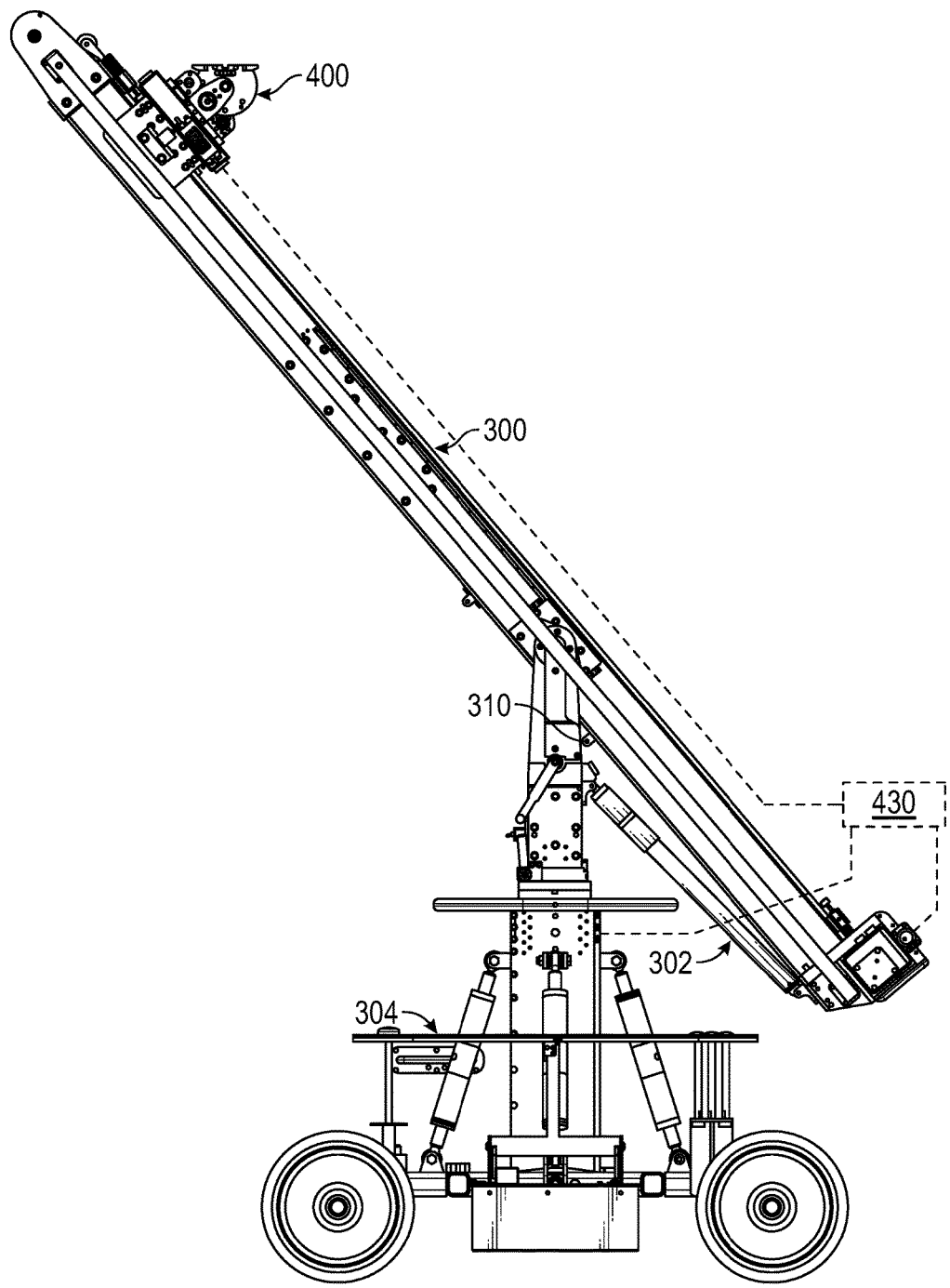
FIG. 29 is a side view of the camera slider embodiment of FIG. 28 shown in the full up position.

Turning now to FIGS. 28-31, an alternative balanced camera slider 300 is supported on a mobile base 304. A telescoping locking strut 302 is pivotally attached to the column of the mobile base 304 and to the back end of the camera slider 300. FIGS. 29-29 show an electronic levelling head 400 mounted on the camera slider 300. As shown in FIGS. 28 and 29, the camera slider 300 can pivot between elevation angles AE of greater than +/−45° and up to +/−50° or 60°, providing a wide range of elevation angles, relative to horizontal HH or the ground surface. As shown in FIGS. 28 and 29, resilient down stops 308 and 310 on the camera slider 300 come to rest against the column of the mobile base to set the minimum and maximum elevation angles.

Figure 30:
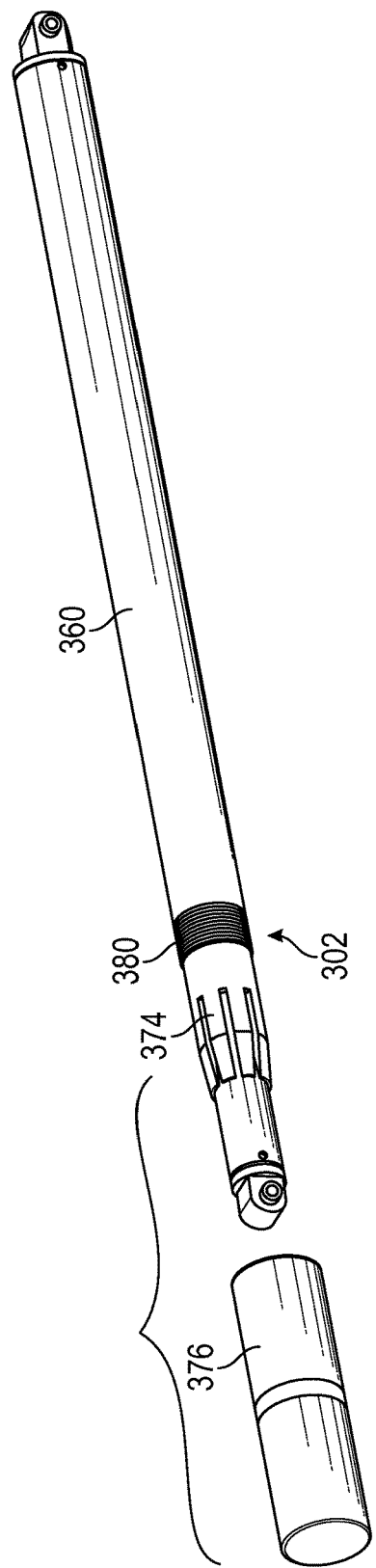
FIG. 30 is an exploded perspective view of the telescoping locking strut shown in FIGS. 28-29.
Figure 31:
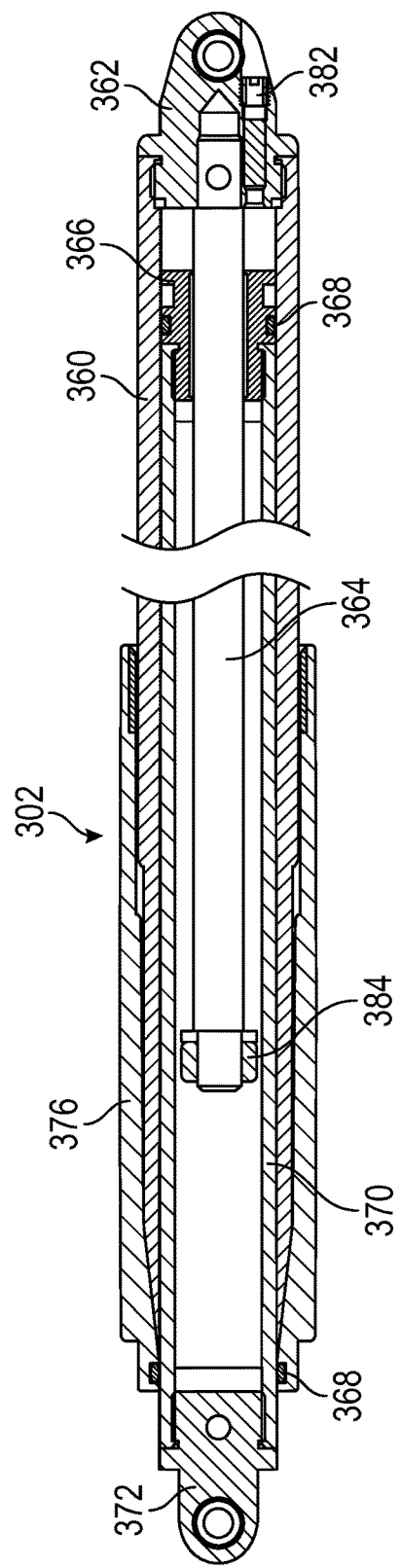
FIG. 31 is a section view of the telescoping locking strut shown in FIG. 30.

The telescoping locking strut 302 shown in FIGS. 30-31 is generally similar to the telescoping locking strut shown in FIGS. 25-26, but with an extended range of travel. The telescoping locking strut 302 has an outer tube cap 362 attached to the back end of an outer tube 360. A rod 364 is rigidly attached to the outer tube cap 362 and extends forward within the outer tube 360. A rod stop 384 is provided on the forward end of the rod 364. A collar 366 is attached to the back end of an inner tube 370, with the collar 366 sliding on the rod 364. A collet 376 is threaded onto the front end of the outer tube 360. The collet 376 has an angled or stepped inner surface which engages fingers 374. As a result, tightening the collet 376 onto the outer tube 360 causes the fingers 374 to clamp onto the inner tube 370, locking the strut 302 against telescoping movement. Conversely, loosening the collet 376 allows telescoping movement of strut 302, with the inner tube 370 sliding into or out of the outer tube 360. In the design shown, the collet 376 is adapted to be tightened and loosened by turning with one or two hands, without use of a tool. For some uses, the telescoping locking strut 202 or 302 may be removed entirely.

As the collet may be operated by hand, no tool is needed to operate the locking strut 302 to change the elevation angle AE of the camera slider 300. Extending movement is limited via the collar 366 running up against the rod stop 384. O-rings 368 may be provided on the collar 366 and on the collet 376. The locking strut 302 may be dimensioned so that the maximum locking force is below a threshold value, even with the collet 376 fully tightened onto the threads 380. If used, this feature allows the camera slider 300 to be displaced if a force greater than the threshold value acts on the camera slider 300, for example if the camera slider 300 accidently collides with another object. Allowing displacement of the camera slider 300 under these conditions may reduce potential damage to the camera slider 300 and surrounding objects.

Figure 32:
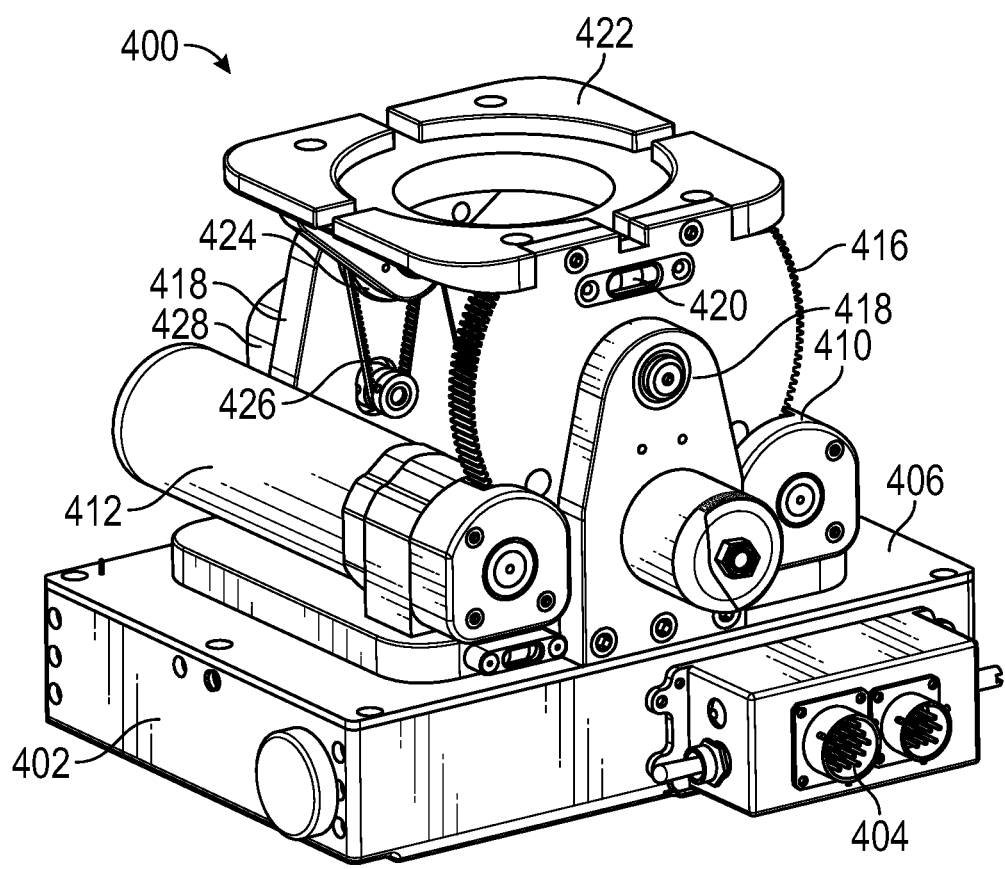
FIG. 32 is a perspective view of the electronic levelling head shown in FIGS. 28 and 29.
Figure 33:
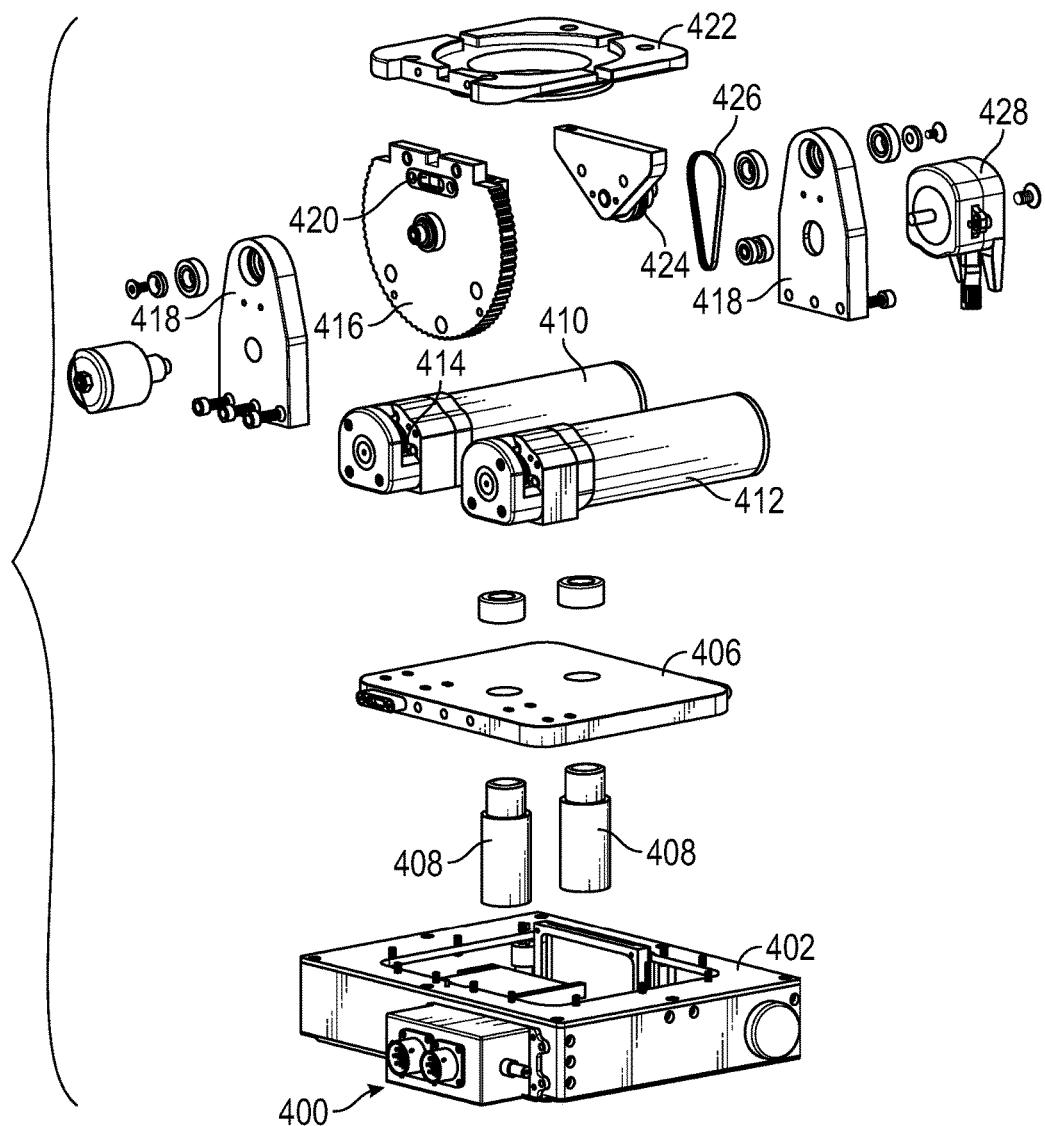
FIG. 33 is an exploded perspective view of the electronic levelling head shown in FIG. 32.
Figure 34:
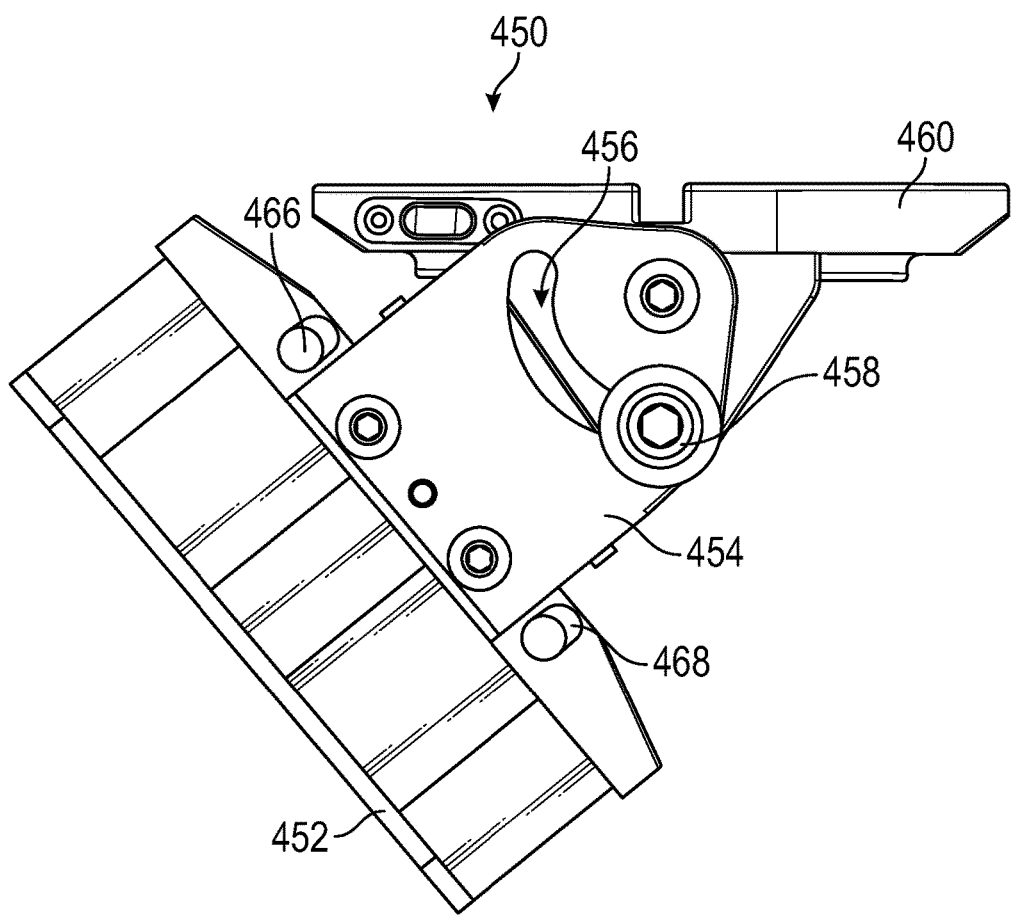
FIG. 34 is a side view of an alternative embodiment of a manual levelling head.

FIGS. 32-33 show the electronic levelling head 400 shown in FIGS. 28-29. As shown in FIGS. 32-33, the electronic levelling head 400 has connectors 404 on a base 402. A motor plate 406 is supported on plate posts 408 and is attached to the base 402. A first motor 410 and a second motor 412 is attached to the motor plate 406. Each motor has a pinion gear 414 meshed with a ring gear 416. A camera mounting plate 422 is rigidly attached to the top end of the ring gear 416, with the ring gear 416 pivotally attached to arms 418 bolted onto the motor plate 406. A bubble level may be provided on the mounting plate 422 and on the ring gear 416. A belt 426 extends around a sensor sprocket 424 that pivots with the mounting plate 422, and around an angle sensor 428 which electronically measures the angle of the mounting plate 422. The ring gear 416 has an angular range of movement sufficient to maintain the camera mounting plate 422 at a level position (parallel to HH) regardless of the elevation angle AE of the camera slider. For example, if the camera slider 300 has an elevation angle AE range of +/−50°, the angular range of movement of the ring gear 416 is at least nominally larger, for example +/−55° or 60°.

In use, the electronic levelling head is electrically connected to a controller 430 which senses the angle of the mounting plate 422 relative to horizontal, and which also controls the motors 410 and 412. The motors 410 and 412 may be biased in opposite directions to avoid backlash. The controller 430 may be designed to automatically keep the mounting plate 422 (and a camera on the mounting plate) in a level or horizontal position, regardless of movements of the camera slider 300 or the mobile base 304. The controller 430 may also control sliding movement of the levelling head along the length of the arm, either via preprogrammed movement or based on an interface, such as joystick, operated by a camera crew member. The controller 430 may also control operation of the mobile base, if used, such as operation of a telescoping column, or control of the wheel motors which propel and steer the mobile base.

Figure 35:
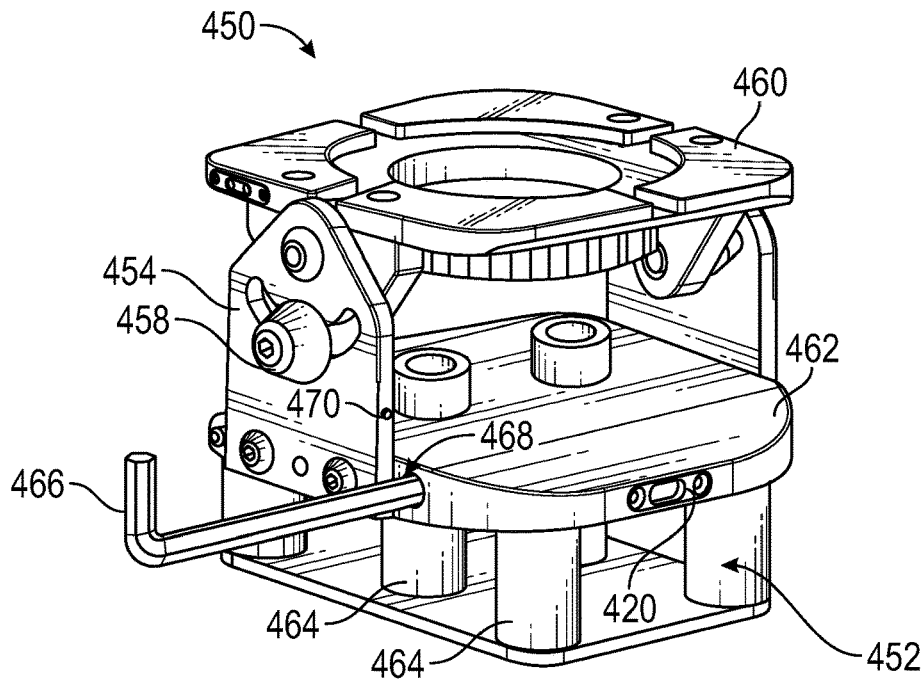
FIG. 35 is a top, front and left side perspective view of the manual levelling head shown in FIG. 34.
Figure 36:
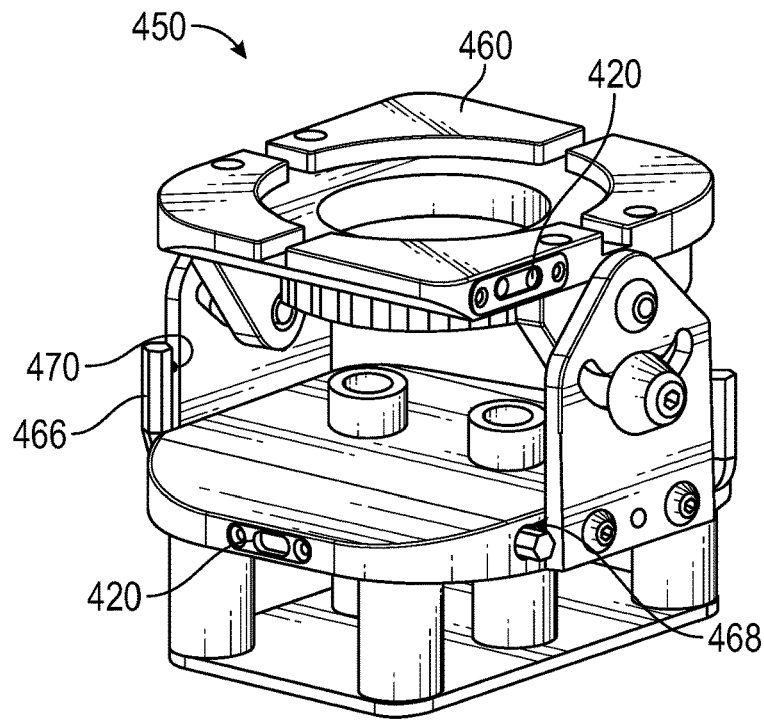
FIG. 36 is a top, front and right side perspective view of the manual levelling head shown in FIG. 34.

The camera slider and the levelling head 400 or 450 may position the camera lens at an extreme elevation angle, to the extent that parts of the camera slider may be in the field of view. In this case, the side handle bars 312 on one or both sides of the camera slider can be removed quickly by loosening front and rear attachment bolts 314, to remove the handle bars 312 from the field of view. The side handle bars 312 may be similar to the handle bar 44 shown in FIGS. 1 and 2, FIGS. 34-36 show an alternative manual levelling head 450 which may be used with the camera sliders described above. The levelling head 450 has an arm plate 462 attached to a base 452 by posts 464. A mounting plate 460 has a standard fitting for mounting a camera. The mounting plate 460 is pivotally attached to arms 454 which are bolted onto the arm plate 462. A locking bolt 458 extends through an arc slot 456 in one or both of the arms 454. Temporarily loosening the locking bolt (s) 458 allows for manually pivoting the mounting plate 460 to a desired position. As best shown in FIG. 35, a tool 466 for loosening and tightening the locking bolt (s) 458 may be stored in a tool bore 468 extending through the arm plate 462. The tool 466 may be secured in the tool bore 468 via a magnet 470 on the arm 454, when the tool is not in use. The levelling head 450 may optionally have two tools 466, as shown in FIG. 36. In comparison to the electronic levelling head 400 shown in FIG. 32, the manual levelling head 450 is lighter, more compact, and is typically 4-6 cm shorter, which may be advantageous in some applications.

Thus, a novel telescoping camera crane and a novel camera slider have been shown and described. Changes and substitutions may of course be made without departing from the spirit and scope of the invention. The invention, therefore, should not be limited, except by the following claims and their equivalents.

The invention claimed is:

1. A camera slider, comprising:
   a base and an arm pivotally attached to the base;
   a counterweight carriage supported on the arm on carriage rollers;
   an electric drive motor for moving the counterweight carriage linearly on top of the arm;
   a slider counterweight movable from a first position, wherein the counterweight carriage is at a first end of the arm and the slider counterweight is at a second end of the arm, and a second position wherein the counterweight carriage is at the second end of the arm and the slider counterweight is at the first end of the arm;
   a telescoping locking strut having a first end pivotally attached to a back end of the arm, and a second end pivotally attached to the base, with the telescoping locking strut allowing the arm to pivot to an angle of elevation of at least plus or minus 45 degrees;
   an electronic levelling head attached to the mounting plate, and an electronic controller electrically connected to the electronic levelling head and to the electric drive motor;

the electronic levelling head further including a ring gear attached to a camera mounting plate, a first electric motor having a first pinion gear meshed with the ring gear, and a second electric motor having a second pinion gear meshed with the ring gear, and with the first electric motor biased in a first direction and the second electric motor biased in a second direction, with the motors operable to move the camera mounting plate without backlash.

2. The camera slider of claim 1 with the electronic levelling head further including an electronic sensor positioned to sense an angular position of the camera mounting plate, and with the electronic sensor electrically connected to the electronic controller.

3. The camera slider of claim 1 with the telescoping locking strut allowing the arm to pivot to an angle of elevation of at least plus or minus 55 degrees.

* * * * *